(12) United States Patent
Frodis et al.

(10) Patent No.: US 9,441,661 B2
(45) Date of Patent: *Sep. 13, 2016

(54) MICROSCALE AND MILLIMETER SCALE DEVICES INCLUDING THREADED ELEMENTS, METHODS FOR DESIGNING, AND METHODS FOR MAKING

(71) Applicant: Microfabrica Inc., Van Nuys, CA (US)

(72) Inventors: Uri Frodis, Los Angeles, CA (US);
Adam L. Cohen, Dallas, TX (US);
Christopher R. Folk, Los Angeles, CA (US)

(73) Assignee: Microfabrica Inc., Van Nuys, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/054,139

(22) Filed: Oct. 15, 2013

(65) Prior Publication Data

US 2014/0140788 A1  May 22, 2014

Related U.S. Application Data

(63) Continuation of application No. 12/651,318, filed on Dec. 31, 2009, now abandoned.

(60) Provisional application No. 61/142,135, filed on Dec. 31, 2008.

(51) Int. Cl.
*F16B 35/04* (2006.01)
*F16B 33/02* (2006.01)

(52) U.S. Cl.
CPC .................................. *F16B 33/02* (2013.01)

(58) Field of Classification Search
CPC ....................................................... F16B 33/02
USPC ........................................................ 411/424
See application file for complete search history.

(56) References Cited

U.S. PATENT DOCUMENTS

| | | | |
|---|---|---|---|
| 1,066,339 A | 7/1913 | Tegelbeckers et al. | |
| 1,366,829 A | 1/1921 | Pascoe | |
| 2,021,051 A | 11/1935 | Desbrueres | |
| 2,263,424 A | 11/1941 | Langer | |
| 2,679,774 A | 6/1954 | MacDonald | |
| 3,069,960 A | 12/1962 | Baubles | |
| 3,129,963 A | 4/1964 | Robbins | |
| 3,167,671 A | 1/1965 | Staak | |
| 3,352,190 A | 11/1967 | Carlson | |
| 3,530,760 A * | 9/1970 | Lindstrand | F16B 25/0047 411/416 |
| 4,798,507 A | 1/1989 | Olah | |
| 4,820,098 A | 4/1989 | Taubert et al. | |
| 4,880,343 A | 11/1989 | Matsumoto | |

(Continued)

OTHER PUBLICATIONS

Adam L. Cohen, "3-D Micromachining by Electrochemical Fabrication", Micromachine Devices, Mar. 1999, pp. 6-7.

(Continued)

*Primary Examiner* — Gary Estremsky
(74) *Attorney, Agent, or Firm* — Dennis R. Smalley

(57) ABSTRACT

Embodiments of the invention provide threaded elements alone, in mating pairs, or in conjunction with other elements. Embodiments of the invention also provide for design and fabrication of such threaded elements without violating minimum feature size design rules or causing other interference issues that may result from the fabrication of such thread elements using a multi-layer multi-material electrochemical fabrication process.

12 Claims, 21 Drawing Sheets

(56) References Cited

U.S. PATENT DOCUMENTS

| | | | |
|---|---|---|---|
| 4,906,151 A | 3/1990 | Kubis | |
| 4,917,555 A | 4/1990 | Taubert | |
| 4,973,209 A * | 11/1990 | Essom | F16B 33/02 411/308 |
| 5,098,240 A * | 3/1992 | Gapp | B29C 70/202 411/14 |
| 5,190,637 A | 3/1993 | Guckel | |
| 5,564,874 A * | 10/1996 | Agatonovic | C04B 35/80 411/417 |
| 5,624,219 A * | 4/1997 | Hamanaka | F16B 31/021 411/308 |
| 5,718,618 A | 2/1998 | Guckel et al. | |
| 5,722,808 A * | 3/1998 | Pritchard | F16B 33/02 411/366.3 |
| 5,837,083 A * | 11/1998 | Booth | F16L 9/16 138/144 |
| 6,027,630 A | 2/2000 | Cohen | |
| 6,149,363 A | 11/2000 | March | |
| 6,158,938 A | 12/2000 | Savoji | |
| 6,174,312 B1 | 1/2001 | Laminger | |
| 6,217,269 B1 * | 4/2001 | Jentzen | B65D 41/0471 411/296 |
| 6,464,439 B1 * | 10/2002 | Janitzki | F16B 33/02 411/283 |
| 6,817,632 B1 * | 11/2004 | You | F16L 25/0063 285/276 |
| 7,195,989 B2 | 3/2007 | Lockard et al. | |
| 7,239,219 B2 | 7/2007 | Brown et al. | |
| 7,246,979 B2 | 7/2007 | Fujii et al. | |
| 7,252,861 B2 | 8/2007 | Smalley | |
| 7,501,328 B2 | 3/2009 | Lockard et al. | |
| 7,686,770 B2 | 3/2010 | Cohen | |
| 2005/0029109 A1 | 2/2005 | Zhang et al. | |
| 2005/0189959 A1 | 9/2005 | Cohen et al. | |
| 2005/0230261 A1 | 10/2005 | Cohen et al. | |
| 2006/0006888 A1 | 1/2006 | Kruglick et al. | |
| 2006/0282065 A1 | 12/2006 | Cohen | |
| 2007/0009339 A1 * | 1/2007 | Merck | F16B 35/06 411/409 |
| 2007/0158200 A1 | 7/2007 | Cohen et al. | |
| 2007/0198038 A1 | 8/2007 | Cohen et al. | |
| 2007/0219459 A1 | 9/2007 | Cohen | |
| 2007/0264100 A1 | 11/2007 | Fujii et al. | |
| 2007/0265648 A1 | 11/2007 | Cohen | |
| 2007/0280803 A1 | 12/2007 | Pritchard | |
| 2008/0213065 A1 | 9/2008 | Sussenbach | |
| 2010/0086378 A1 | 4/2010 | Lin | |
| 2010/0134131 A1 | 6/2010 | Chen et al. | |

OTHER PUBLICATIONS

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

Adam L. Cohen, et al., "EFAB: Rapid, Low-Cost Desktop Micromachining of High Aspect Ratio True 3-D MEMS", Proc. 12th IEEE Micro Electro Mechanical Systems Workshop, IEEE, Jan. 17-21, 1999, pp. 244-251.

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

"Microfabrication—Rapid Prototyping's Killer Application", Rapid Prototyping Report, CAD/CAM Publishing, Inc., Jun. 1999, pp. 1-5.

* cited by examiner

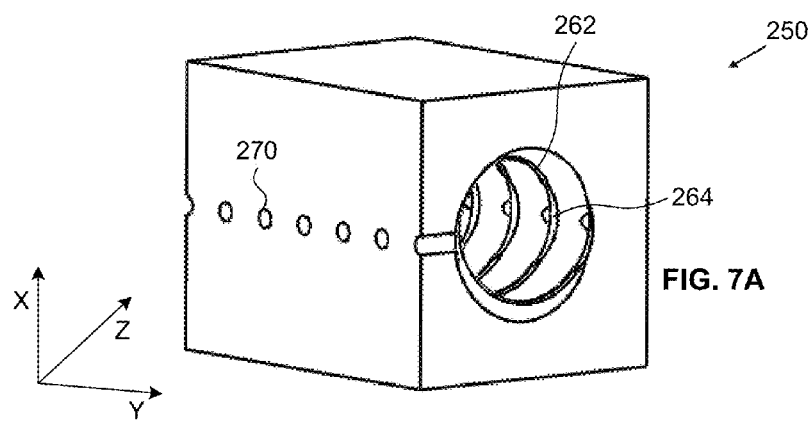
FIG. 7A
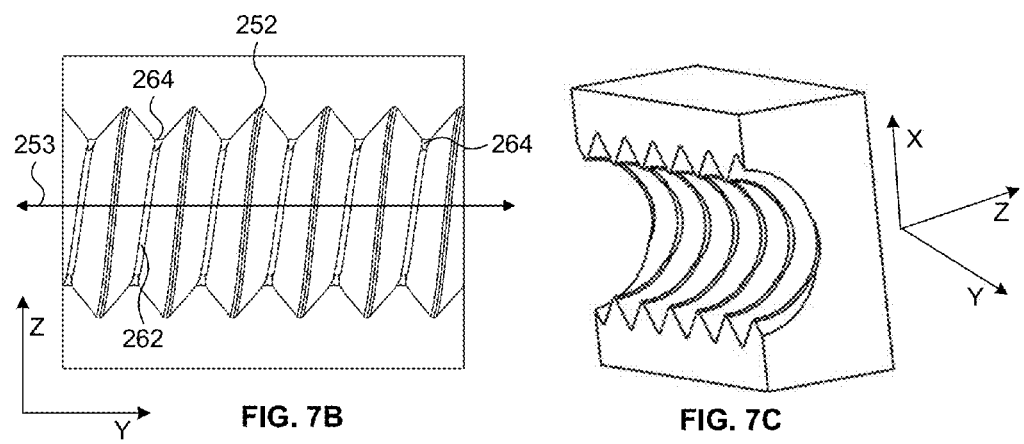
FIG. 7B
FIG. 7C
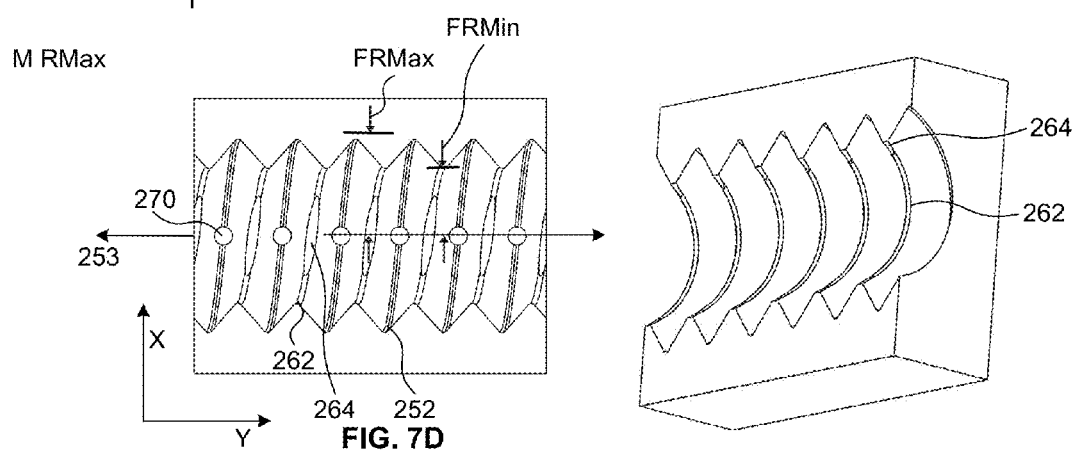
FIG. 7D
FIG. 7E

MICROSCALE AND MILLIMETER SCALE DEVICES INCLUDING THREADED ELEMENTS, METHODS FOR DESIGNING, AND METHODS FOR MAKING

RELATED APPLICATIONS

This application is a continuation of U.S. patent application Ser. No. 12/651,318, filed on Dec. 31, 2009, now abandoned. The '318 application claims benefit of U.S. Provisional Patent Application No. 61/142,135, filed Dec. 31, 2008. The referenced applications are incorporated herein by reference as if set forth in full herein.

FIELD OF THE INVENTION

The present invention relates generally to the field of micro-scale and millimeter-scale structures and devices and more particularly to such devices or structure that include threaded elements that are fabricated from a plurality of adhered layers, designs for such devices, and multi-material, multi-layer electrochemical fabrication methods for producing such devices.

BACKGROUND OF THE INVENTION;

Electrochemical Fabrication:

An electrochemical fabrication technique for forming three-dimensional structures from a plurality of adhered layers is being commercially pursued by Microfabrica® Inc. (formerly MEMGen Corporation) of Van Nuys, Calif. under the name EFAB®.

Various electrochemical fabrication techniques were described in U.S. Pat. No. 6,027,630, issued on Feb. 22, 2000 to Adam Cohen. Some embodiments of this electrochemical fabrication technique allows the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFAB™)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.

2. Then, blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). At least one CC mask is used for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of (1) the substrate, (2) a previously formed layer, or (3) a previously deposited portion of a layer on which deposition is to occur. The pressing together of the CC mask and relevant substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6, separated from mask 8, onto which material will be deposited during the process of forming a layer. CC mask plating selectively deposits material 22 onto substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1O.

The CC mask plating process is distinct from a "through-mask" plating process in that in a through-mask plating process the separation of the masking material from the substrate would occur destructively. Furthermore in a through mask plating process, opening in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned, state and once fabricated. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example it is indicated that the plating base may consist of 150 angstroms of titanium and 150 angstroms of nickel where both are applied by sputtering.

Electrochemical Fabrication provides the ability to form prototypes and commercial quantities of miniature objects, parts, structures, devices, and the like at reasonable costs and in reasonable times. In fact, Electrochemical Fabrication is an enabler for the formation of many structures that were hitherto impossible to produce. Electrochemical Fabrication opens the spectrum for new designs and products in many industrial fields. Even though Electrochemical Fabrication offers this new capability and it is understood that Electrochemical Fabrication techniques can be combined with designs and structures known within various fields to produce new structures, certain uses for Electrochemical Fabrication provide designs, structures, capabilities and/or features not known or obvious in view of the state of the art.

A need exists in various fields for miniature devices having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process.

SUMMARY OF THE INVENTION

It is an object of some embodiments of the invention to provide improved design methods for creating threaded elements and fabricating such elements from a plurality of adhered layers without violating minimum feature size fabrication rules.

It is an object of some embodiments of the invention to provide improved threaded elements for fabrication from a plurality of adhered layers where the elements have features removed from regions where minimum feature size violations might otherwise occur.

It is an object of some embodiments of the invention to provide improved threaded elements and threaded element designs having extended axial lengths in regions where the radial dimensions perpendicular to the axis of the threaded device are transitioning from decreasing to increasing dimensions.

It is an object of some embodiments of the invention to provide millimeter-scale and micro-scale threaded devices having unique features that improve one or both of manufacturability and/or device functionality.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

A first aspect of the invention provides a method for designing a micro-scale or millimeter scale threaded element, for fabrication from a plurality of planar multi-material layers, wherein each layer is formed from at least one structural material and at least one sacrificial material, including: (a) creating a solid model representing the desired threaded element; (b) cutting the solid model along selected planes corresponding to layers from which the element will be fabricated; (c) identifying features of the individual layers that violate minimum feature size rules; and (d) removing at least a portion of the features from the design that violate minimum feature size rules to derive a modified element design.

A second aspect of the invention provides a method for designing a micro-scale or millimeter scale threaded element, for fabrication from a plurality of planar multi-material layers, wherein each layer is formed from at least one structural material and at least one sacrificial material, including: (a) creating a solid model representing a complement of the desired threaded element; (b) cutting the solid model along selected planes corresponding to layers from which the element will be fabricated; (c) identifying features of the individual layers that violate minimum feature size rules; and (d) removing at least a portion of the features from the design that violate minimum feature size rules to derive a modified complementary element design.

A third aspect of the invention provides a method for fabricating a micro-scale or millimeter scale threaded element from a plurality of planar multi-material layers, wherein each layer is formed from at least one structural material and at least one sacrificial material, including: (a) creating a solid model representing the desired threaded element; (b) cutting the solid model along selected planes corresponding to layers from which the element will be fabricated, (c) identifying features of the individual layers that violate minimum feature size rules; (d) removing at least a portion of the features from the design that violate minimum feature size rules to derive a modified element design; (e) using the modified element design to create data representing each layer of the element; (f) supplying a substrate on which to fabricate a first multi-material layer of the element; (g) fabricating the first multi-material layer on the substrate; (h) fabricating a plurality of successive layers with each formed on a previously formed layer; and (i) after fabrication of the plurality of layers, separating the sacrificial material from multiple layers of structural material.

A fourth aspect of the invention provides a method for designing a micro-scale or millimeter scale threaded element, for fabrication from a plurality of planar multi-material layers, wherein each layer is formed from at least one structural material and at least one sacrificial material, including: (a) creating a solid model representing a complement of the desired threaded element; (b) cutting the solid model along selected planes corresponding to layers from which the element will be fabricated, (c) identifying features of the individual layers that violate minimum feature size rules; and (d) removing at least a portion of the features from the design that violate minimum feature size rules to derive a modified complementary element design; (e) using the modified complementary element design to create data representing each layer of the element; (f) supplying a substrate on which to fabricate a first multi-material layer of the element; (g) fabricating the first multi-material layer on the substrate; (h) fabricating a plurality of successive layers with each formed on a previously formed layer; and (i) after fabrication of the plurality of layers, separating the sacrificial material from multiple layers of structural material.

Numerous variations of all of the four aspects of the invention exist and include, for example, wherein one or more of the following conditions are met: (1) the threaded element is formed using a multi-material multi-layer electrochemical fabrication process, (2) the threaded structure is released from a build substrate after fabrication, (3) the threaded element is used with a another threaded element that is formed from a plurality of adhered layers; (4) the threaded element is used with another threaded element formed in a non-layered manner; (5) the threaded element has a thread with a design pitch (turns/mm) wherein the layers from which the element is formed have thickness (mm) and wherein the ratio of pitch to layer thickness that is greater than 1:5; (6) the threaded element has a thread with a design pitch (turns/mm) wherein the layers from which the element is formed have thickness (mm) and wherein the ratio of layer pitch to layer thickness is an integer greater than 4, more preferably greater than 6, and even more preferably greater than 8; and/or; (7) The thread element is co-fabricated with one or more elements intended to provide one or more of (a) features to enhance tapping; (b) spring biasing, (c) preloading, (d) eased handling; (e) locking once engaged, and/or (f) release once/curved/tapered screws; variable pitch/diameter screws; built-in springs and washers.

A fifth aspect provides a method for fabricating a micro-scale or millimeter scale male threaded element from a plurality of planar multi-material layers, wherein each layer is formed from at least one structural material and at least one sacrificial material, including: (a) creating a solid model representing the desired male threaded element cutting the solid model along selected planes corresponding to layers from which the element will be fabricated, (b) supplying a substrate on which to fabricate a first multi-material layer of the element, (c) fabricating the first multi-material layer on the substrate, (d) fabricating a plurality of successive layers with each formed on a previously formed layer; and (e) after fabrication of the plurality of layers, separating the sacrificial material from multiple layers of structural material to release the male threaded element, wherein the male threaded element has an axial dimension and a radial dimension that extends perpendicular to the axial dimension, the male threaded element includes at least one outward facing thread comprising radial extensions and radial depressions that define a spiral turn of at least 90° around and along the axial dimension, wherein there exists a maximum and minimum radial extension for the thread for each axial position; and wherein selected portions of the radial features of the threaded element meet a criteria selected from the group consisting of: (1) the selected portions are located along the maximum radial dimension and are flattened relative to non-selected portions of the maximum radial dimension such that the selected portions have longer axial lengths relative to the axial length of the non-selected portions, (2) the selected portions are located along the maximum radial dimension and are flattened relative to non-selected portions of the maximum radial dimension such that the selected portions have longer axial lengths relative to the axial length of the non-selected portions wherein the longer axial length is at least as large as the layer thickness, (3) the selected portions are located along the maximum radial dimension and are flattened relative to non-selected portions of the maximum radial dimension such that the selected portions have longer axial lengths relative to the axial length of the non-selected portions wherein the longer axial length is at least as large as a minimum feature size, (4) the selected portions are located along the minimum radial dimension along and are flattened relative to non-selected portions of the minimum radial dimension such that the selected portions have longer axial lengths relative to the axial length of the non-selected portions, (5) the selected portions are located along the minimum radial dimension along and are flattened relative to non-selected portions of the minimum radial dimension such that the selected portions have longer axial lengths relative to the axial length of the non-selected portions wherein the longer axial length is at least as large as the layer thickness, and (6) the selected portions are located along the minimum radial dimension along and are flattened relative to non-selected portions of the minimum radial dimension such that the selected portions have longer axial lengths relative to the axial length of the non-selected portions wherein the longer axial length is at least as large as a minimum feature size.

Numerous variations of the fifth aspect of the invention exist and include, for example: (1) the spiral turn being continuous, (2) the spiral turn being discontinuous, (3) the spiral turn extending at least 180°, (4) the spiral turn extending at least 360°, (5) the spiral turn extending at least 720°, and (6) the female thread element being formed along with the male threaded element.

Additional examples of variation (6) of the fifth aspect of the invention include, for example: (a) the female and male threaded elements being in an at least partially assembled state, and (b) the female threaded element including a plurality of release holes.

A sixth aspect of the invention provides a method for fabricating a micro-scale or millimeter scale female threaded element from a plurality of planar multi-material layers, wherein each layer is formed from at least one structural material and at least one sacrificial material, including: (a) creating a solid model representing the desired female threaded element, (b) cutting the solid model along selected planes corresponding to layers from which the element will be fabricated, (c) supplying a substrate on which to fabricate a first multi-material layer of the element, (d) fabricating the first multi-material layer on the substrate, (e) fabricating a plurality of successive layers with each formed on a previously formed layer; and (f) after fabrication of the plurality of layers, separating the sacrificial material from multiple layers of structural material to release the female threaded element, wherein the female threaded element has an axial dimension and a radial dimension that extends perpendicular to the axial dimension, wherein the female threaded element includes at least one inward facing thread comprising radial extensions defining openings of smaller radius and radial depressions defining openings of larger radius, wherein the thread provides a spiral turn of at least 90° around and along the axial dimension, wherein there exists a maximum and minimum radial extension for the thread for each axial position; and wherein selected portions of the radial features of the threaded element meet a criteria selected from the group consisting of: (1) the selected portions are located along the maximum radial dimension and are flattened relative to non-selected portions of the maximum radial dimension such that the selected portions have longer axial lengths relative to the axial length of the non-selected portions, (2) the selected portions are located along the maximum radial dimension and are flattened relative to non-selected portions of the maximum radial dimension such that the selected portions have longer axial lengths relative to the axial length of the non-selected portions wherein the longer axial length is at least as large as the layer thickness, (3) the selected portions are located along the maximum radial dimension and are flattened relative to non-selected portions of the maximum radial dimension such that the selected portions have longer axial lengths relative to the axial length of the non-selected portions wherein the longer axial length is at least as large as a minimum feature size, (4) the selected portions are located along the minimum radial dimension along and are flattened relative to non-selected portions of the minimum radial dimension such that the selected portions have longer axial lengths relative to the axial length of the non-selected portions, (5) the selected portions are located along the minimum radial dimension along and are flattened relative to non-selected portions of the minimum radial dimension such that the selected portions have longer axial lengths relative to the axial length of the non-selected portions wherein the longer axial length is at least as large as the layer thickness, and (6) the selected portions are located along the minimum radial dimension along and are flattened relative to non-selected portions of the minimum radial dimension such that the selected portions have longer axial lengths relative to the axial length of the non-selected portions wherein the longer axial length is at least as large as a minimum feature size.

Numerous variations of the sixth aspect of the invention exist and include, for example: (1) the spiral turn being continuous, (2) the spiral turn being discontinuous, (3) the spiral turn extending at least 180°, (4) the spiral turn extending at least 360°, (5) the spiral turn extending at least 720°, and (6) the male thread element being formed along with the female threaded element.

Additional examples of variation (6) of the sixth aspect of the invention include, for example: the female and male threaded elements being at in an at least partially assembled state during formation; and furthermore the female threaded element may include a plurality of release holes.

A seventh aspect of the invention provides a micro-scale or millimeter scale male threaded element, including: (a) an axial dimension and a radial dimension that extends perpendicular to the axial dimension, (b) at least one outward facing thread comprising radial extensions and radial depressions that define a spiral turn of at least 90° around and along the axial dimension, wherein the threaded element has a stair stepped configuration with the stair steps defining a plurality of planes spaced from adjacent planes by a layer thickness, wherein there exists a maximum and minimum radial extension for the thread for each axial position; and wherein selected portions of the radial features of the threaded element meet a criteria selected from the group consisting of: (1) the selected portions are located along the maximum radial dimension and are flattened relative to non-selected portions of the maximum radial dimension such that the selected portions have longer axial lengths relative to the axial length of the non-selected portions, (2) the selected portions are located along the maximum radial dimension and are flattened relative to non-selected portions of the maximum radial dimension such that the selected portions have longer axial lengths relative to the axial length of the non-selected portions wherein the longer axial length is at least as large as the layer thickness, (3) the selected portions are located along the maximum radial dimension and are flattened relative to non-selected portions of the maximum radial dimension such that the selected portions have longer axial lengths relative to the axial length of the non-selected portions wherein the longer axial length is at least as large as a minimum feature size, (4) the selected portions are located along the minimum radial dimension along and are flattened relative to non-selected portions of the minimum radial dimension such that the selected portions have longer axial lengths relative to the axial length of the non-selected portions, (5) the selected portions are located along the minimum radial dimension along and are flattened relative to non-selected portions of the minimum radial dimension such that the selected portions have longer axial lengths relative to the axial length of the non-selected portions wherein the longer axial length is at least as large as the layer thickness, and (6) the selected portions are located along the minimum radial dimension along and are flattened relative to non-selected portions of the minimum radial dimension such that the selected portions have longer axial lengths relative to the axial length of the non-selected portions wherein the longer axial length is at least as large as a minimum feature size.

Numerous variations of the seventh aspect of the invention exists and include: (1) the spiral turn being continuous, (2) the spiral turn being discontinuous, (3) the spiral turn extending at least 180°, (4) the spiral turn extending at least 360°, (5) the spiral turn extending at least 720°, and (6) the male thread element being configured to thread into a counterpart female threaded element.

An eighth aspect of the invention provides a micro-scale or millimeter scale female threaded element, including: (a) an axial dimension and a radial dimension that extends perpendicular to the axial dimension, (b) at least one inward facing thread comprising radial extensions defining openings of smaller radius and radial depressions defining openings of larger radius, wherein the thread provides a spiral turn of at least 90° around and along the axial dimension, wherein the thread has a stair stepped configuration with the stair steps defining a plurality of planes spaced from adjacent planes by a layer thickness, wherein there exists a maximum and minimum radial extension for the thread for each axial position; and wherein selected portions of the radial features of the threaded element meet a criteria selected from the group consisting of: (1) the selected portions are located along the maximum radial dimension and are flattened relative to non-selected portions of the maximum radial dimension such that the selected portions have longer axial lengths relative to the axial length of the non-selected portions, (2) the selected portions are located along the maximum radial dimension and are flattened relative to non-selected portions of the maximum radial dimension such that the selected portions have longer axial lengths relative to the axial length of the non-selected portions wherein the longer axial length is at least as large as the layer thickness, (3) the selected portions are located along the maximum radial dimension and are flattened relative to non-selected portions of the maximum radial dimension such that the selected portions have longer axial lengths relative to the axial length of the non-selected portions wherein the longer axial length is at least as large as a minimum feature size, (4) the selected portions are located along the minimum radial dimension along and are flattened relative to non-selected portions of the minimum radial dimension such that the selected portions have longer axial lengths relative to the axial length of the non-selected portions, (5) the selected portions are located along the minimum radial dimension along and are flattened relative to non-selected portions of the minimum radial dimension such that the selected portions have longer axial lengths relative to the axial length of the non-selected portions wherein the longer axial length is at least as large as the layer thickness, and (6) the selected portions are located along the minimum radial dimension along and are flattened relative to non-selected portions of the minimum radial dimension such that the selected portions have longer axial lengths relative to the axial length of the non-selected portions wherein the longer axial length is at least as large as a minimum feature size.

Numerous variations of the eighth aspect of the invention exist and include, for example: (1) the spiral turn being continuous, (2) the spiral turn being discontinuous, (3) the spiral turn extending at least 180°, (4) the spiral turn extending at least 360°, (5) the spiral turn extending at least 720°, and (6) the female thread element being configured to receive a counterpart male threaded element.

A ninth aspect of the invention provides a micro-scale or millimeter scale device, including: (a) a male threaded element, including (i) an axial dimension and a radial dimension that extends perpendicular to the axial dimension, (ii) at least one outward facing thread comprising radial extensions and radial depressions that define a spiral turn of at least 90° around and along the axial dimension, wherein the male threaded element has a stair stepped configuration with the stair steps defining a plurality of planes spaced from adjacent planes by a layer thickness, and (b) a female threaded element, including: (i) an axial dimension and a radial dimension that extends perpendicular to the axial dimension, at least one inward facing female thread comprising radial extensions defining openings of smaller radius and radial depressions defining openings of larger radius, wherein the thread provides a spiral turn of at least 90° around and along the axial dimension, wherein the female threaded element has a stair stepped configuration with the stair steps defining a plurality of planes spaced from adjacent planes by a layer thickness, wherein the male threaded element is configured to thread into the female threaded element.

Numerous variations of the ninth aspect of the invention exist and include, for example: (1) the spiral turn of the male threaded element being continuous, (2) the spiral turn of the male threaded element being discontinuous, (3) the spiral turn of both the male and female threaded elements extending at least 180°, (4) the spiral turn of both the male and female threaded elements extending at least 360°, (5) the spiral turn of both the male and female threaded elements extending at least 720°, (6) the female threaded element including a plurality of release holes, (7) the male threaded element including a coreless thread, (8) the male threaded element including a helix without a central core, and (9) the male threaded element including a multiple threaded element.

An additional example of variation (1) of the ninth aspect of the invention includes the spiral turn of the female threaded element being continuous. A further example of variation (1) of the ninth aspect of the invention includes the spiral turn of the female threaded element being discontinuous.

An additional example of variation (2) of the ninth aspect of the invention includes the spiral turn of the female threaded element being continuous. A further example of variation (2) of the ninth aspect of the invention includes the spiral turn of the female threaded element being discontinuous.

A tenth aspect of the invention provides a micro-scale or millimeter scale device that includes: comprising: (a) a threaded male element that includes: (i) a longitudinal axis; (ii) a stair stepped configuration with the stair steps defining a plurality of planes spaced from adjacent planes by a layer thickness; (iii) for a majority of the length of the threaded element each position along the longitudinal axis has at least one minimum and at least one maximum radial extension, wherein the maximum radial extension that has a surface with a perpendicular component that faces away from the longitudinal axis and the minimum radial extension has a surface with a perpendicular component that faces toward the longitudinal axis.

Numerous variations of the tenth aspect of the invention are possible and include, for example: (1) the threaded element additionally extending for a plurality of complete rotations (e.g. two turns to ten turns); (2) at least a portion of the maximum radial extensions have axial lengths greater than the layer thickness; (3) the device additionally includes a threaded female receptacle that rotationally engages at least a portion of the threaded male element; (4) the threaded male element ends in a head element at one end which includes an surface for engaging a tool to cause relative turning of the thread element.

The disclosure of the present invention provides for the design of threaded elements, including providing design modifications to avoid violating minimum features size rules and/or other structural interference issues, and fabrication of such elements from a plurality of adhered layers wherein each successive layer comprising at least two materials, one of which is a structural material and the other of which is a sacrificial material, and wherein each successive layer defines a successive cross-section of the three-dimensional structure, and wherein the forming of each of the plurality of successive layers includes: (i) depositing a first of the at least two materials, (ii) depositing a second of the at least two materials, (iii) the planarization of the first and second materials; and after the forming of the plurality of successive layers, separating at least a portion of the sacrificial material from the structural material to reveal the three-dimensional structure.

Other aspects of the invention will be understood by those of skill in the art upon review of the teachings herein. Other aspects of the invention may involve combinations of the above noted aspects of the invention or of their variations. These other aspects of the invention may provide various combinations of the aspects and variations presented above as well as provide other configurations, structures, functional relationships, and processes that have not been specifically set forth above.

BRIEF DESCRIPTION OF THE DRAWINGS

FIGS. 7A-7E provide a perspective view (FIG. 7A), plan section views (FIGS. 7B & 7D), and perspective section views (FIGS. 7C-7E) views of a solid model of a sample female threaded structure.

DETAILED DESCRIPTION OF PREFERRED EMBODIMENTS

Electrochemical Fabrication in General

FIGS. 1A-1G, 2A-2F, and 3A-3C illustrate various features of one form of electrochemical fabrication. Other electrochemical fabrication techniques are set forth in the '630 patent referenced above, in the various previously incorporated publications, in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 1A:
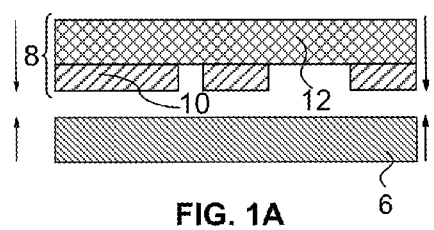
FIGS. 1A-1C schematically depict side views of various stages of a CC mask plating process, while FIGS. 1D-G schematically depict a side views of various stages of a CC mask plating process using a different type of CC mask.
Figure 1B:
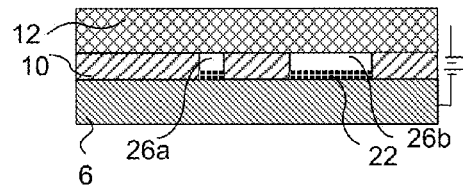
Figure 1C:
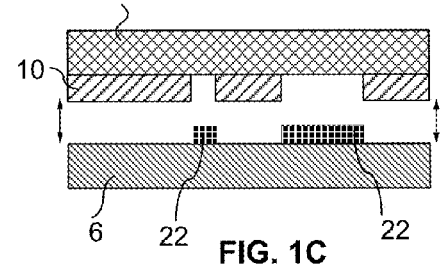
Figure 1D:
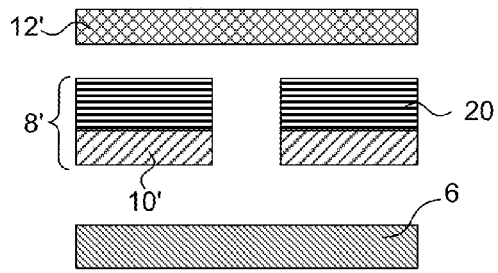
Figure 1E:
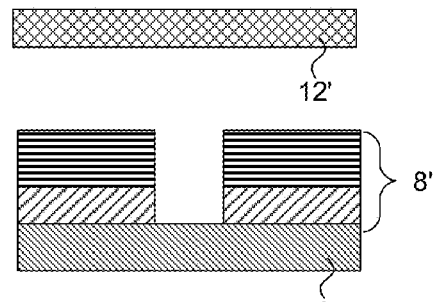
Figure 1F:
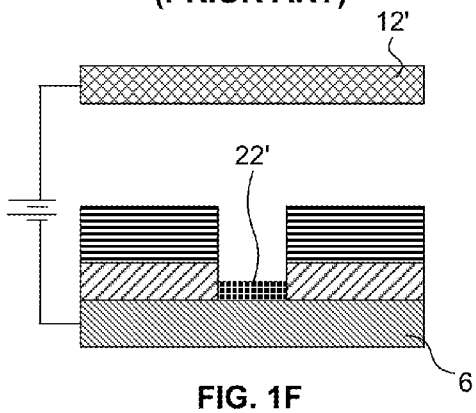
Figure 1G:
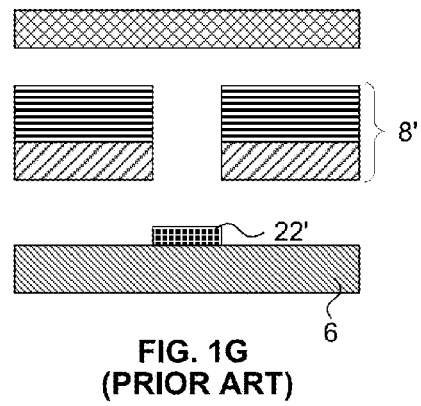
Figure 2A:
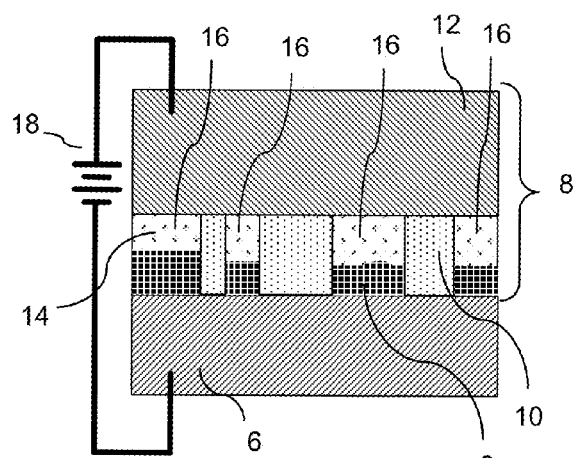
FIGS. 2A-2F schematically depict side views of various stages of an electrochemical fabrication process as applied to the formation of a particular structure where a sacrificial material is selectively deposited while a structural material is blanket deposited.
Figure 2B:
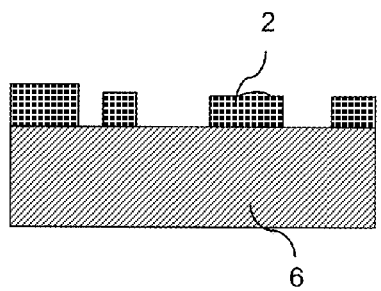
Figure 2C:
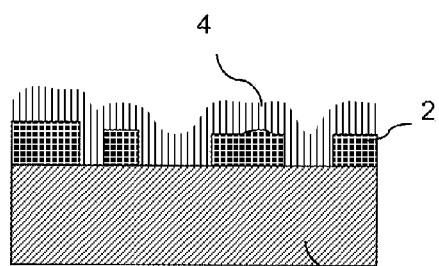
Figure 2D:
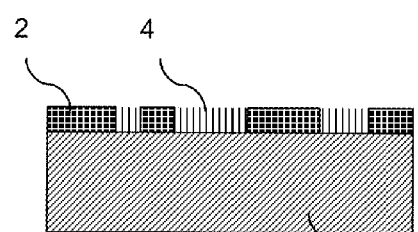
Figure 2E:
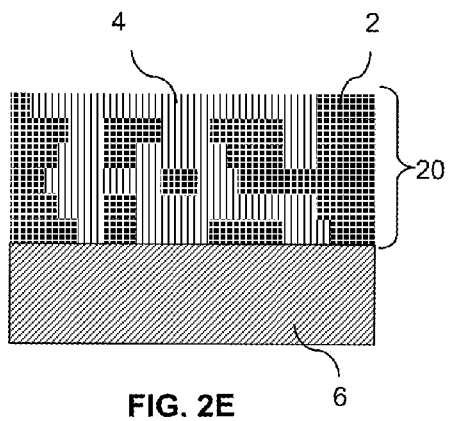
Figure 2F:
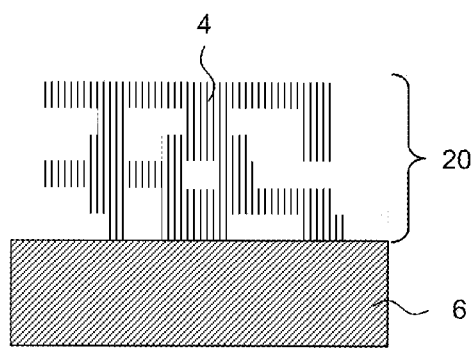
Figure 3A:
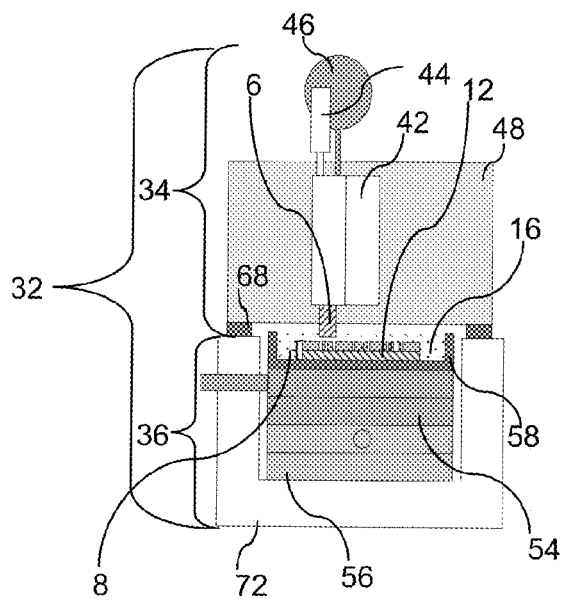
FIGS. 3A-3C schematically depict side views of various example subassemblies that may be used in manually implementing the electrochemical fabrication method depicted in FIGS. 2A-2F.
Figure 3B:
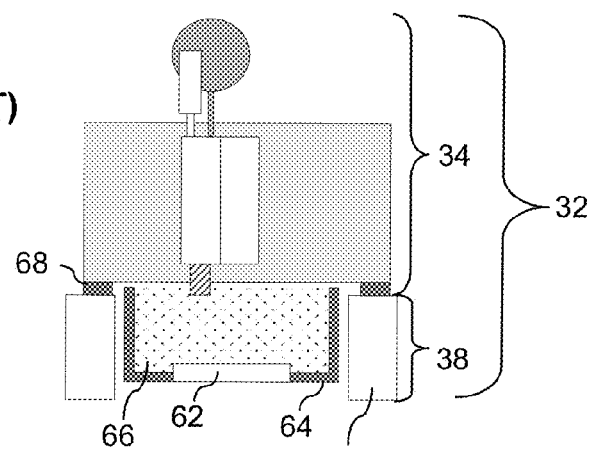
Figure 3C:
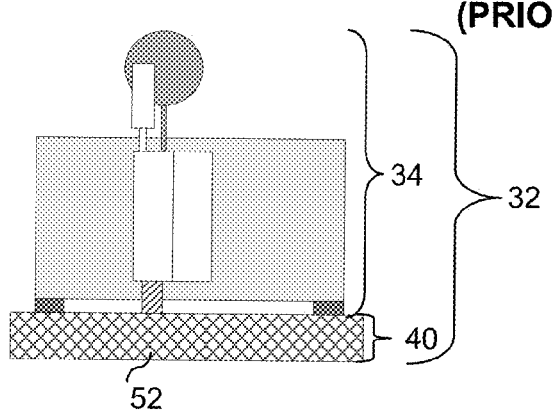
Figure 4A:
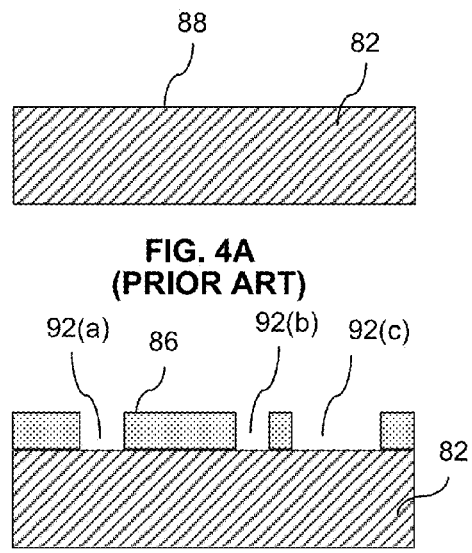
FIGS. 4A-4F schematically depict the formation of a first layer of a structure using adhered mask plating where the blanket deposition of a second material overlays both the openings between deposition locations of a first material and the first material itself
Figure 4B:
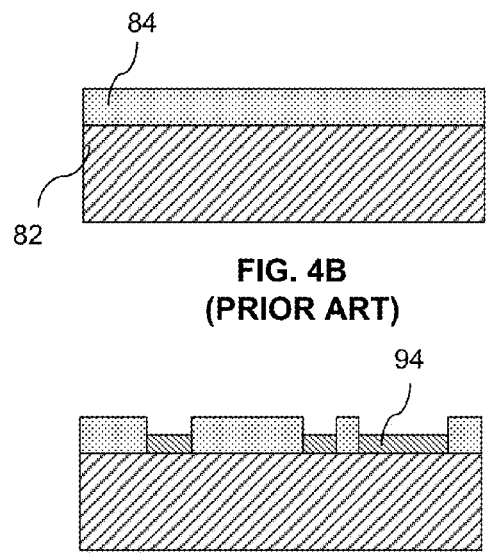
Figure 4C:
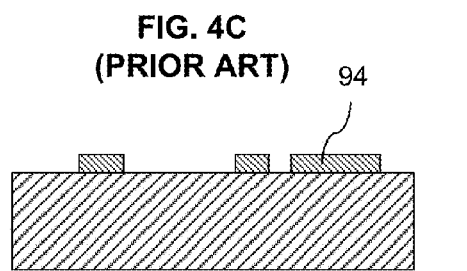
Figure 4D:
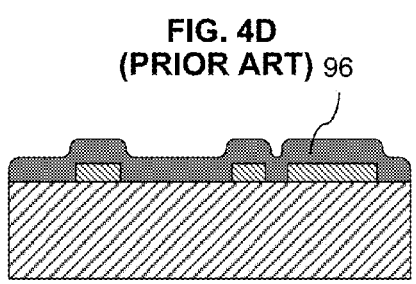
Figure 4E:
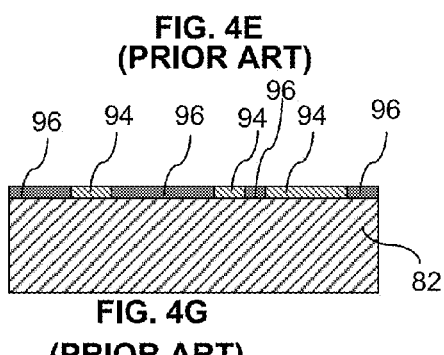
Figure 4F:
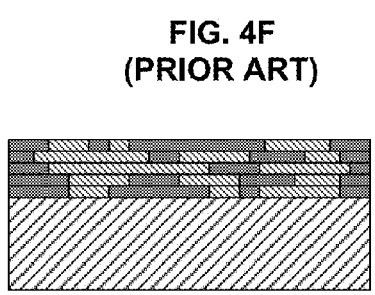
Figure 4G:
FIG. 4G depicts the completion of formation of the first layer resulting from planarizing the deposited materials to a desired level.
Figure 4H:
FIGS. 4H and 4I respectively depict the state of the process after formation of the multiple layers of the structure and after release of the structure from the sacrificial material.
Figure 4I:
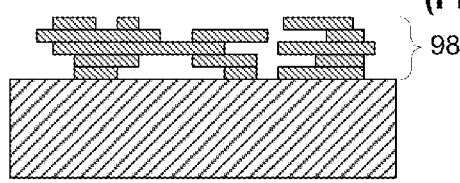

FIGS. 4A-4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4 G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some of which may be electrodeposited or electroless deposited. Some of these structures may be formed form a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter scale have the same meaning and refer to devices that may have one or more dimensions extending into the 0.5-20 millimeter range, or somewhat larger and with features positioned with precision in the 10-100 micron range and with minimum features sizes on the order of 100 microns.

The various embodiments, alternatives, and techniques disclosed herein may form multi-layer structures using a single patterning technique on all layers or using different patterning techniques on different layers. For example, various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration). Such use of selective etching and interlaced material deposition in association with multiple layers is described in U.S. patent application Ser. No. 10/434,519, by Smalley, now U.S. Pat. No. 7,252,861, and entitled "Methods of and Apparatus for Electrochemically Fabricating Structures Via Interlaced Layers or Via Selective Etching and Filling of Voids layer elements" which is hereby incorporated herein by reference as if set forth in full.

Temporary substrates on which structures may be formed may be of the sacrificial-type (i.e. destroyed or damaged during separation of deposited materials to the extent they cannot be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

Definitions

This section of the specification is intended to set forth definitions for a number of specific terms that may be useful in describing the subject matter of the various embodiments of the invention. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take presence over any contradictory definitions or allusions found in any materials which are incorporated herein by reference.

"Build" as used herein refers, as a verb, to the process of building a desired structure or plurality of structures from a plurality of applied or deposited materials which are stacked and adhered upon application or deposition or, as a noun, to the physical structure or structures formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height. Unless explicitly noted otherwise, "vertical" as used herein refers to the build axis or nominal build axis (if the layers are not stacking with perfect registration) while "horizontal" refers to a direction within the plane of the layers (i.e. the plane that is substantially perpendicular to the build axis).

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layers such that the openings in the previous build layers are filled with materials deposited in association with current build layers which will cause interlacing of build layers and material deposits. Such interlacing is described in U.S. patent application Ser. No. 10/434,519 now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways. For example by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process). For example, by levels at which process steps or operations are repeated. At levels at which, at least theoretically, lateral extends of structural material can be changed to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer boundary level). For example, lapping removes material in a substantially non-selective manner though some amount of recession one material or another may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization maybe followed or proceeded by thermally induced planarization (.e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

"Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to a one or more surfaces of a desired build structure that has been released from a sacrificial material.

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of two or more materials to form a single material.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 $\mu m^2$) but thin (e.g. less than 0.5 microns) regions of sacrificial copper sandwiched between deposits of nickel may define regions of functional structural material depending on ability of a release etchant to remove the sandwiched copper.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred as masking materials or as temporary materials. These separation processes are sometimes referred to as a release process and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. Sacrificial material is typically removed via a chemical etching operation but in some embodiments may be removed via a melting operation or electrochemical etching operation. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases the volume of structural material removed is typically minuscule compared to the amount that is retained and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal. As will be discussed hereafter, masking materials though typically sacrificial in nature are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to a one or more surfaces of a desired build structure that has been released from an initial sacrificial material. This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of two or more materials to form a single material.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary structural materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event such coatings are non-selectively applied, selected portions may be removed (1) prior to depositing either a sacrificial material or structural material as part of a current layer or (2) prior to beginning formation of the next layer or they may remain in place through the layer build up process and then etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multilayer structures" are structures formed from multiple build layers of deposited or applied materials.

"Multilayer three-dimensional (or 3D or 3-D) structures" are Multilayer Structures that meet at least one of two criteria: (1) the structural material portion of at least two layers of which one has structural material portions that do not overlap structural material portions of the other.

"Complex multilayer three-dimensional (or 3D or 3-D) structures" are multilayer three-dimensional structures formed from at least three layers where a line may be defined that hypothetically extends vertically through at least some portion of the build layers of the structure will extend from structural material through sacrificial material and back through structural material or will extend from sacrificial material through structural material and back through sacrificial material (these might be termed vertically complex multilayer three-dimensional structures). Alternatively, complex multilayer three-dimensional structures may be defined as multilayer three-dimensional structures formed from at least two layers where a line may be defined that hypothetically extends horizontally through at least some portion of a build layer of the structure that will extend from structural material through sacrificial material and back through structural material or will extend from sacrificial material through structural material and back through sacrificial material (these might be termed horizontally complex multilayer three-dimensional structures). Worded another way, in complex multilayer three-dimensional structures, a vertically or horizontally extending hypothetical line will extend from one or structural material or void (when the sacrificial material is removed) to the other of void or structural material and then back to structural material or void as the line is traversed along at least a portion of the line.

"Moderately complex multilayer three-dimensional (or 3D or 3-D) structures are complex multilayer 3D structures for which the alternating of void and structure or structure and void not only exists along one of a vertically or horizontally extending line but along lines extending both vertically and horizontally.

"Highly complex multilayer (or 3D or 3-D) structures are complex multilayer 3D structures for which the structure-to-void-to-structure or void-to-structure-to-void alternating occurs once along the line but also occurs a plurality of times along a definable horizontally or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" or "MFS" refers to a necessary or desirable spacing between structural material elements on a given layer that are to remain distinct in the final device configuration. If the minimum feature size is not maintained for structural material elements on a given layer, the fabrication process may result in structural material inadvertently bridging what were intended to be two distinct elements (e.g. due to masking material failure or failure to appropriately fill voids with sacrificial material during formation of the given layer such that during formation of a subsequent layer structural material inadvertently fills the void). More care during fabrication can lead to a reduction in minimum feature size. Alternatively, a willingness to accept greater losses in productivity (i.e. lower yields) can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of gaps or voids (e.g. the MFS for sacrificial material regions when sacrificial material is deposited first). Conversely a minimum feature size for structure material regions (minimum width or length of structural material elements) may be specified. Depending on the fabrication method and order of deposition of structural material and sacrificial material, the two types of minimum feature sizes may be the same or different. In practice, for example, using electrochemical fabrication methods as described herein, the minimum features size on a given layer may be roughly set to a value that approximates the layer thickness used to form the layer and it may be considered the same for both structural and sacrificial material widths. In some more rigorously implemented processes (e.g. with higher examination regiments and tolerance for rework), it may be set to an amount that is 80%, 50%, or even 30% of the layer thickness. Other values or methods of setting minimum feature sizes may be used. Worded another way, depending on the geometry of a structure, or plurality of structures, being formed, the structure, or structures, may include elements (e.g. solid regions) which have dimensions smaller than a first minimum feature size and/or have spacings, voids, openings, or gaps (e.g. hollow or empty regions) located between elements, where the spacings are smaller than a second minimum feature size where the first and second minimum feature sizes may be the same or different and where the minimum feature sizes represent lower limits at which formation of elements and/or spacing can be reliably formed. Reliable formation refers to the ability to accurately form or produce a given geometry of an element, or of the spacing between elements, using a given formation process, with a minimum acceptable yield. The minimum acceptable yield may depend on a number of factors including: (1) number of features present per layer, (2) numbers of layers, (3) the criticality of the successful formation of each feature, (4) the number and severity of other factors effecting overall yield, and (5) the desired or required overall yield for the structures or devices themselves. In some circumstances, the minimum size may be determined by a yield requirement per feature which is as low as 70%, 60%, or even 50%. While in other circumstances the yield requirement per feature may be as high as 90%, 95%, 99%, or even higher. In some circumstances (e.g. in producing a filter element) the failure to produce a certain number of desired features (e.g. 20-40% failure may be acceptable while in an electrostatic actuator the failure to produce a single small space between two moveable electrodes may result in failure of the entire device. The MFS, for example, may be defined as the minimum width of a narrow and processing element (e.g. photoresist element or sacrificial material element) or structural element (e.g. structural material element) that may be reliably formed (e.g. 90-99.9 times out of 100) which is either independent of any wider structures or has a substantial independent length (e.g. 200-1000 microns) before connecting to a wider region.

"Layerize" or "Layerized" refer to the conversion of a 3D CAD design or other design of a structure into a plurality of layers or cross-sections representing the successive layers which define a quantized version of the structure as it might be formed. Layerization requires that a particular layering axis be defined (e.g. X, Y, or Z) and that a layering resolution (i.e. layer thickness) be specified for the various levels along the layering axis. The layering resolutions may be fixed or variable.

Miniature Threaded Elements Formed from Multi-Material Multi-Layer Processes

Embodiments of the invention provide threaded elements alone, in mating pairs, and/or in conjunction with other elements. Some needs for threads arise from a desire to assemble micro-scale devices and to attach micro-scale devices (permanently or temporarily) to other micro-scale devices or to larger-scale devices. Threads can also be used to provide relative motion of one component with respect to another within a single device. Such relative motion may be used to position separate components or to bias different portions of a single structure. Such relative motion may be used to lock component into desired positions or to lock out components from moving into undesired positions (e.g. to ensure that components move from fabrication positions to functional or operational positions and do not move back to fabrication positions). Such components may also be used to convert rotational motion to translational motion (e.g. as in an ACME thread, lead screw, or ball screw arrangement).

Screws or other threaded elements may also be used to preload elements of a micro-device that are fabricated in one position but which when moved to another position can provide a force (e.g., preloading a spring to hold a pressure relief valve closed). Screws or other threaded elements (temporary or permanent) may also be used for purposes of handling devices.

The multi-layer multi-material fabrication methods as taught herein enable the fabrication of threads on a scale that is not possible through conventional thread forming techniques. Even when conventional thread forming techniques are viable, it is advantageous to avoid additional process steps or assembly steps to form threads or to add a threaded component. At one extreme, a device made using such methods may comprise ready-to use threads; at the other extreme, a device may comprise holes which may be threaded using conventional methods (e.g., taps and dies). Between the two extremes, a device may comprise threads or partial threads which are produced using the multi-material, multi-layer fabrication methods of the present application but which can undergo additional processing (e.g., via a tap or die) before use. The last approach might be used, for example, to reduce the clearances between a male and female threads if fabrication of the entire threaded assembly in an assembled state using the multi-layer, multi-material methods set forth herein would produce an undesirably large clearance. In cases when a female thread requires tapping before use, the EFAB structure may incorporate features such as holes and channels to facilitate release of chips and other fragments produced by the tapping process.

Figure 17:
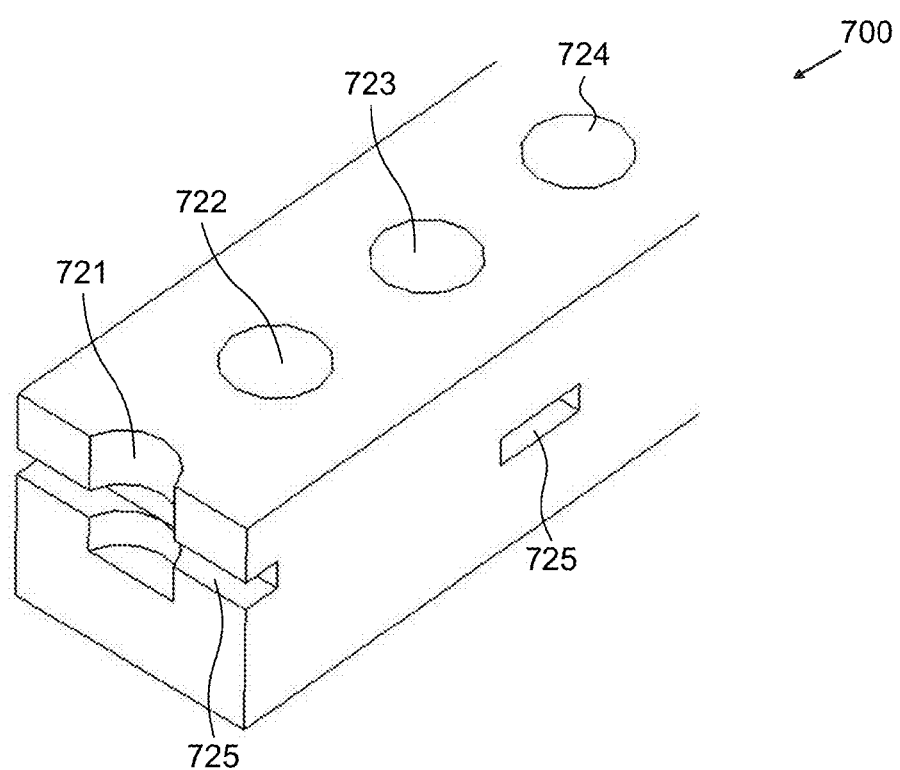
FIG. 17 illustrates a device having holes provided with channels that may facilitate release of chips and other fragments produced by the tapping process.

FIG. 17 illustrates a sample device 700 having holes 722 that can be tapped wherein, the odd-numbered holes starting from the left (seen in cross section) are provided with such a channel 724, while the even-numbered holes are not.

Both female and male threads may be made. In some cases, a thread fabricated using a multi-material, multi-layer electrochemical fabrication method is required to work with a conventionally-manufactured thread (e.g., an EFAB-produced male thread may be required to work with a commercially-available fastener or threaded nut). In the case where the scale of the thread is smaller than what is achievable through conventional manufacturing, both male and female threads can be produced using the methods taught herein. Matching male and female threads can be fabricated in a fully or partially-engaged state, or separately (in which case, a reduced clearance between the two threads may be possible).

There are few limitations on the form that a thread can take when fabricated using a multi-layer multi-material electrochemical process. For instance, in the case of a linear stage, an ACME thread form might be required. In the case of a permanent assembly, an interference thread might be required. The designer may conform to an existing thread form standard, or use an arbitrary thread form. However, the layer thickness does have a direct impact on the minimum possible thread pitch. In some embodiments it may be preferable to correlate the thread pitch to the layer thickness or thicknesses that will be used such that the pitch corresponds to an integral number of layers while in other embodiments, such preference may not exist. In some embodiments, it may be desirable to ensure that the inner and outer diameter of the screw threads correspond to integral numbers of layers so that the thread when layerized will have as symmetric a configuration as possible. It may also be desirable to ensure that the layerization of the thread elements commences at a desired layerization height relative to the thread positions so that a controlled and predictable conversion from a smoothed wall design to a layered version occurs. For a very fine pitch thread, a build with at least some thin layers may be useful. In general, it is desirable to have a layer thickness that is no greater than about $\frac{1}{5}$ to $\frac{1}{6}$ of the thread pitch (i.e. the axial length associated with each full revolution, 360°, of the threaded element) and more preferably no greater than $\frac{1}{8}$ the thread pitch or even smaller. In some specialized embodiments, it may be possible to have fewer layers per thread pitch but special care may be required in designing and/or in layerizing the female and male portions to ensure that layers are formed with appropriate configurations. Furthermore as ratio of layers to thread pitch decreases it is more likely that discontinuities in axial movement will be more apparent as rotation of the thread element or elements occur. In particular, biasing care may be necessary (e.g. via spring loading and compression or lifting during turning so that the stairsteps in the thread elements can move past one another. In some embodiments, when coupled with appropriate biasing, the stairsteps between layers may provide for thread locking which in some cases may be released by manually overcoming the biasing force. In some embodiments additional elements or features may be formed along with or as part of the threaded elements, such additional features may include for example, (1) spring elements that push male and female element away from one another, (2) spring elements that compress male and female elements together, (3) washers, (4) lock washers, (5) engagement mechanisms, (6) thread heads, (7) engagement notches and protrusions may be incorporated on the threads of the threaded elements or on other portions of the threaded elements to provide locking engagement, (8) features for engaging tools via compression such as allen wrenches, screw driver flats, screw driver cross-points, and the like, and/or (9) features for engaging tools via lifting or tensional engagement such as loops or hooks.

In some implementations, particularly when male and female threads may be formed in an engaged state, it may be advantageous to provide etching holes or the like in the body of the female element to ensure adequate access for etching solution to reach the intervening sacrificial material.

In some embodiments, male elements may be formed with internal passages which may or may not be provided female threading for receiving smaller male elements. In some embodiments it may be desirable to provide only righted handed threaded elements while in other embodiments it may be advantageous to provide only left hand threaded elements while in still other embodiments a combination of the two may be provided.

Threads may be designed using 3-D CAD as continuous, smooth, spiraling features. During fabrication by multi-material, multi-layer fabrication methods, these features will take on stair stepped or quantized configurations. In such cases it is generally necessary to modify thread designs from more traditional designs so that minimum feature size violations do not occur during the formation of individual layers and/or so that interference issues do not arise between male and female elements of close tolerance as a result of layerization processes. This is particularly true when the treaded elements will be formed with their longitudinal axis different from that of the layer stacking axis that will be used during fabrication of the device. In particular such modification may involve the need to remove selected regions from the design geometry. The regions requiring removal may be ascertained after layerizing the design and looking at individual layers of the design to locate regions where minimum feature size violations exist and then adding structure or removing structure, whichever is more preferable, to remove the violations and thereafter using the modified design data to form the structure. The resulting threads may have portions missing or truncated, and may no longer be symmetric. The modifications may be performed using the original 3-D CAD design, or on a 2-D basis using the layered version of the CAD design, or using a combination of both approaches.

Regions for potential modification include those regions which may be spaced from one another on a single layer by a gap which is smaller than the minimum feature size. Such gaps may be found at lower and upper junctions where adjacent threads join when the threaded element will be fabricated with its axial direction perpendicular to the direction of layer stacking (e.g. in lowest and highest regions of minimum radial dimension for male elements and the lowest and highest regions of maximum radial dimension for female elements). If problems exist in these regions, design modifications where regions of material are removed (or added) may be appropriate so as to remove the small gaps. Other regions for potential modification include regions where the width of the structural material may be too thin. Such thin features may be found at the upper and lower extends of the threads when the threaded element will be fabricated with its axial direction perpendicular to the direction of layer stacking (e.g. lowest and highest regions of maximum radial dimension for male elements and the lowest and highest regions of minimum radial dimension for female elements).

Additional regions for modification may exist if the male and female threads are to be formed in an engaged or partially engaged state where the spacing or clearance between the elements is too tight. In such situations, the elements may be formed in an unengaged state or by widening the gap in the engaged regions.

When forming threaded elements with their axial orientation aligned with the build axis, unexpected interferences may also occur particularly when the clearance between the ideal male and female elements is at or only slightly greater than the minimum feature size and where the thread pitch is not sufficiently large relative to the thicknesses of the fabrication layers. Such interferences may occur as a result of the clearance reductions resulting from quantization or layerization particularly when levels do not correspond to minimum radial extends of male thread elements (making them somewhat larger in diameter) and maximum radial extends of female element (making them somewhat smaller in diameter). If such growth is sufficiently large it could pose unintended interference issues as the male and female threads are rotated relative to each other or simply cause minimum feature size violations when formed in an engaged configuration.

Figure 18:
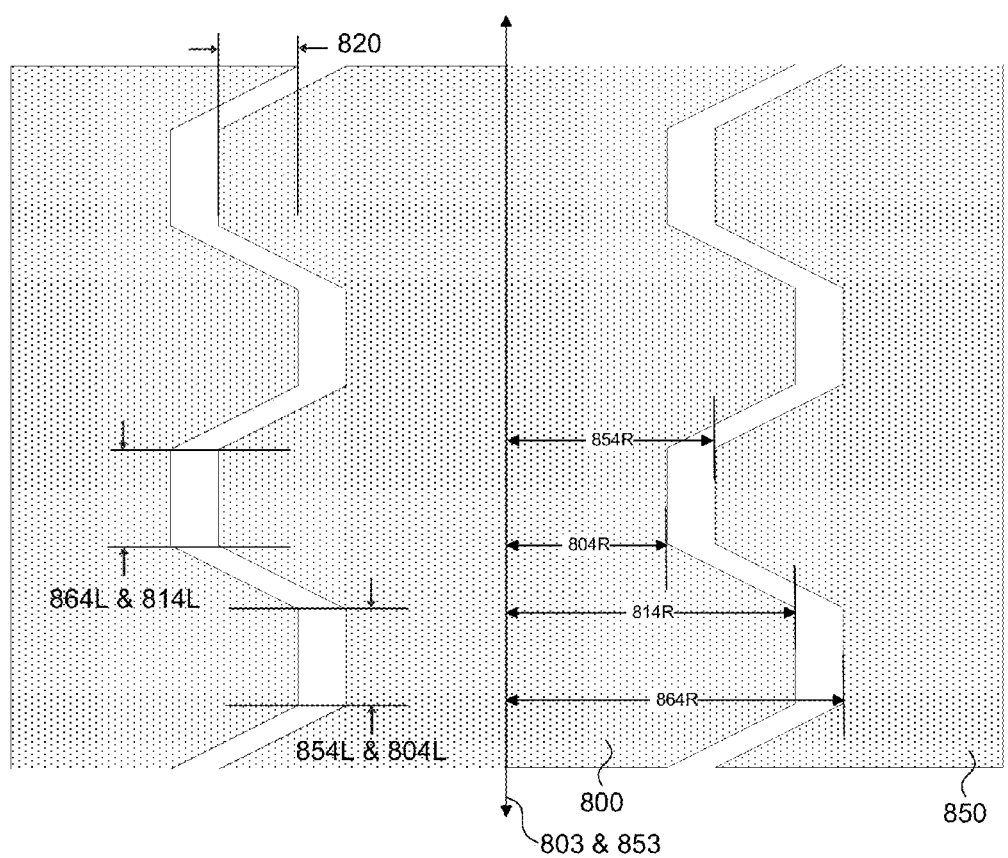
FIG. 18 provides a cut view of example male and female threaded elements having common axes where both elements have similar axial lengths for their minimum and maximum radial dimensions wherein the elements have certain radial thread overlap that is dictated by, for example, the thread pitch and the required axial length of the minimum and maximum features.
Figure 19:
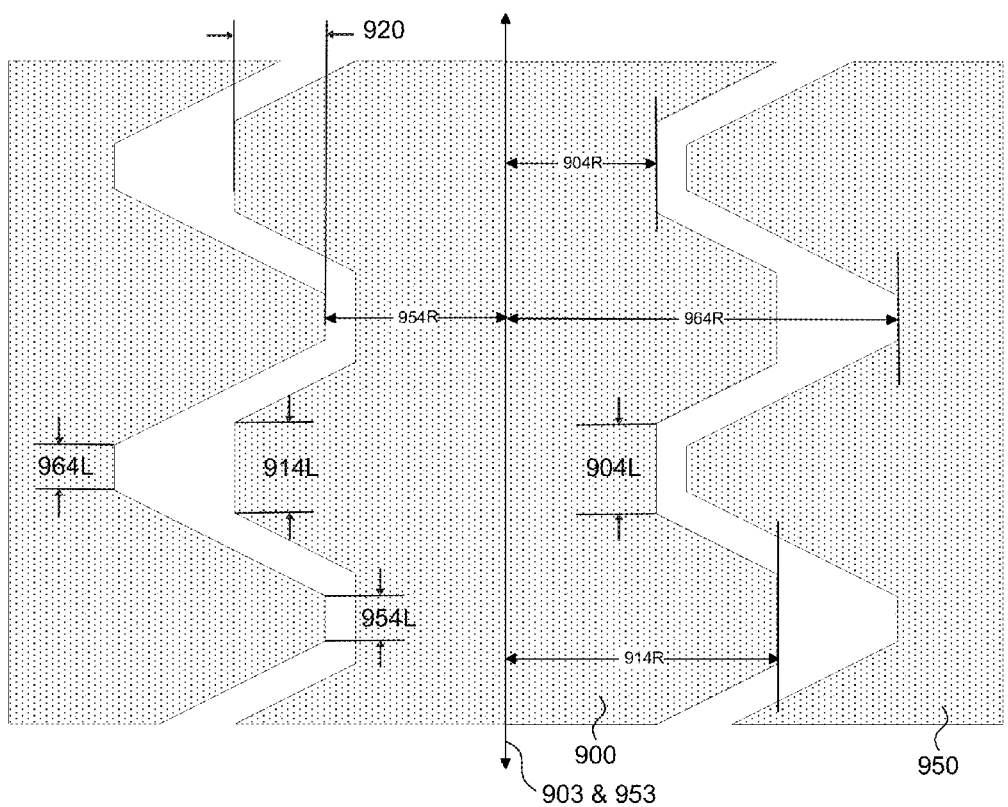
FIG. 19 provides a cut view of an alternative thread configuration of a male threaded element and a female threaded element that have common axes and a thread overlap where the minimum and maximum radial features for the male thread have similar axial lengths, while the minimum and maximum radial features for the female thread also have similar axial lengths but where the axial lengths of the female features are only about one-half of that of the male features.

In some alternative embodiments of the invention, such minimum feature size issues and interference issues may be dealt with by an overall design modification as opposed to the check and modify approach of some embodiments. The design modification may involve increasing the axial widths of both the minimum radial features and maximum radial features of both the male and female elements such that the axial widths exceed the minimum feature size requirement (particularly when the build axis and the axial orientation of the thread element are not parallel). When the build axis and the axial orientation of the thread element are parallel it may be desirable to ensure that the layer thickness and thread pitch are selected so that they do not result in radial offsets over the height of a single layer that approach the designed clearance between the male and female thread elements and/or to ensure that the radial minimums and maximums on the male and female features do not interfere by ensuring they are formed with desired radial dimensions by providing them with an axial width or length greater than one layer thickness. FIG. 18 provides a cut view of an example male and female threaded element where both elements have similar axial lengths for their minimum and maximum radial dimensions wherein the elements have certain radial thread overlap that is dictated by the thread pitch and the required axial length of the minimum and maximum features. FIG. 19 provides a cut view of an alternative configuration where the minimum and maximum radial features for the male thread have similar axial lengths while the minimum and maximum radial features for the female thread also have similar axial lengths but which are about half the length of that of the their male counterparts.

Figure 20:
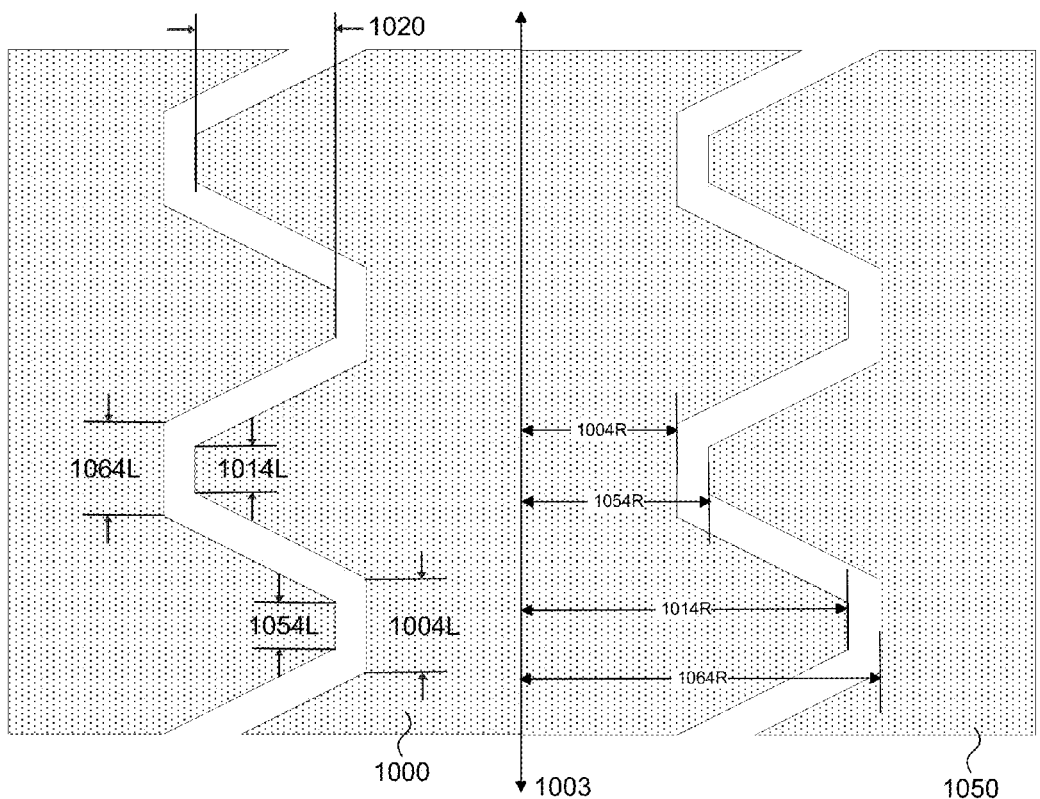
FIG. 20 provides a cut view of an alternative thread configuration of a male threaded element and a female threaded element that have common axes and a thread overlap where the minimum and maximum radial features for the male thread have different axial lengths while the minimum and maximum radial features for the female thread also have different axial lengths but where the axial lengths of the minimum radial female features are less than that of the minimum radial male features and the maximum radial length of the maximum female radial features are greater than that of the maximum radial male features.

In some other alternative embodiments, it may be possible to use male and female thread designs where improved mating and clearance can be achieved by configuring the maximum radial dimensions of the male element to have relatively small axial lengths while the minimum radial dimensions of the male element have larger axial lengths conversely the minimum radial dimensions of the female element may have small axial widths and/or reduced radial dimensions (allowing them to fit comfortably into the axially lengthened minimum dimensions of the male element) and the maximum radial dimensions of the female element may be axially lengthened. An example of such a configuration is shown in the cut view of FIG. 20 showing a male threaded element threaded into a female element where axial lengths of minimum and maximum radial extensions are not the same.

Because of the design flexibility afforded by the multi-layer, multi-material electrochemical fabrication process, threads of unusual geometry may be produced in addition to standard left and right-handed threads, whether of constant diameter or tapered. Examples include hollow screws or threads; cork-screws or threads without central core elements, screws or threads with curved or straight channels, semi-flexible screws or threaded elements, threads with variable cross sectional diameters, screws or threads with varying pitch, segmented threads or screws, threads or screws with built-in features such as coaxial helical springs, leaf springs (e.g., for use in preloading), washers, lock washers, and the like.

In some embodiments, as an alternative to fabricating threads on structural elements produced by multi-material, multi-layer process EFAB structures, threads can be provided by incorporating existing screws, studs, nuts, threaded rods, and the like into such structures. For example, a male thread in the form of a stud may be provided by building a structure with a hole into which a stud is inserted and secured by adhesive, welding, press-fitting, shrink fitting, by capturing the head of a screw in a specially-designed cavity such that the screw shaft protrudes, or (if the hole has built-in threads) by screwing it into place. Cavities or structures able to receive a nut or other female threaded component may also be provided. In some embodiments, structures intended to receive threaded components may be equipped with catches or other spring-like features to retain the components.

Various features of the above noted embodiments are further described below with the aid of the illustrations of FIGS. 5A-20.

Figure 5A:
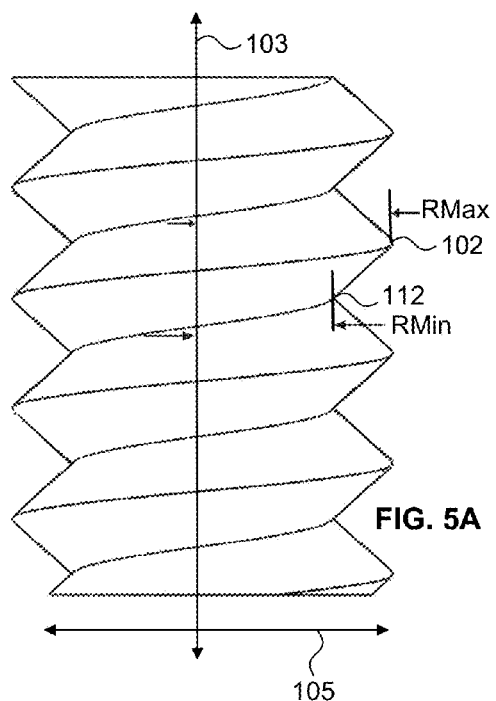
FIG. 5A-5C provide plan (FIG. 5A), perspective (FIG. 5B), and perspective section (FIG. 5C) views of a solid model of a male threaded structure or element without modifications that address minimum feature size limitations or other interference issues as may be necessary when forming the device from a plurality of adhered layers.
Figure 5B:
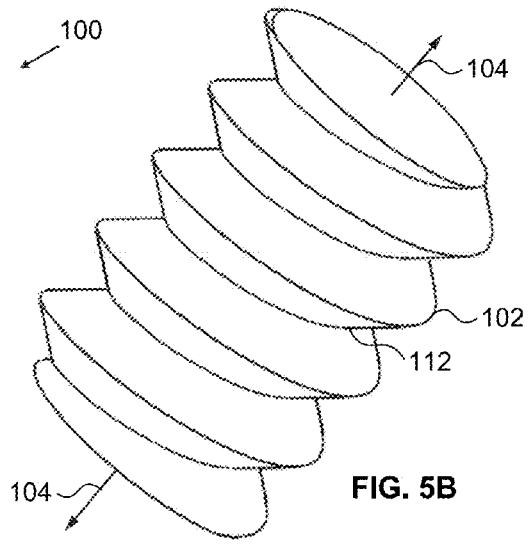
Figure 5C:
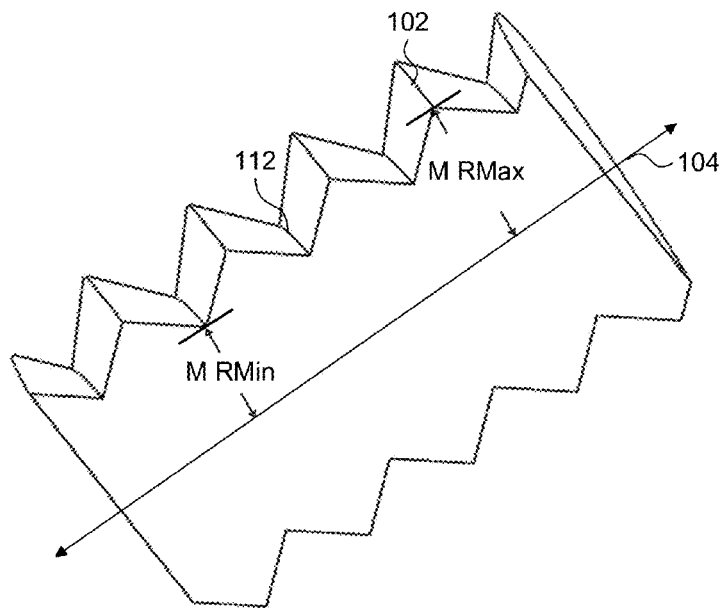

FIG. 5A-5C provide plan (FIG. 5A), perspective (FIG. 5B), and perspective section (FIG. 5C) views of a solid model of a male threaded structure or element without modifications that address minimum feature size limitations or other interference issues as may be necessary when forming the device from a plurality of adhered layers. The threaded structure 100 has a longitudinal or axial orientation as shown by arrow 103 and perpendicular radial directions as shown by arrow 105. This male threaded element has regions of minimal radial extension 112 with radial extents labeled as $MR_{min}$ and regions of maximum radial extension 102 labeled as $MR_{max}$.

Figure 6A:
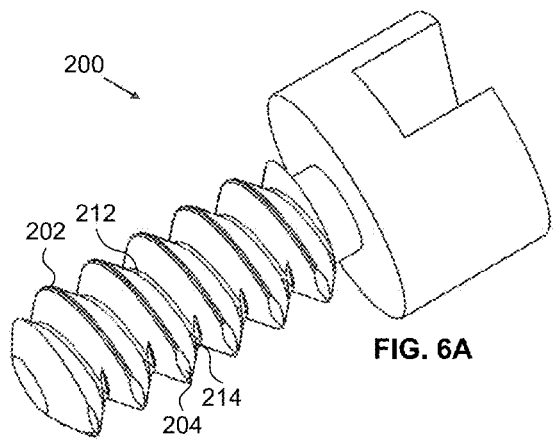
FIGS. 6A-6F provide plan views (FIGS. 6B-6D), perspective views (FIG. 6A), and perspective section views (FIGS. 6E-6F) of a solid model of a male threaded structure or element having an axial orientation along the Y-axis and design modifications on portions of the maximum radial features and minimum radial features, respectively, to allow formation without violating minimum feature size rules.
Figure 6B:
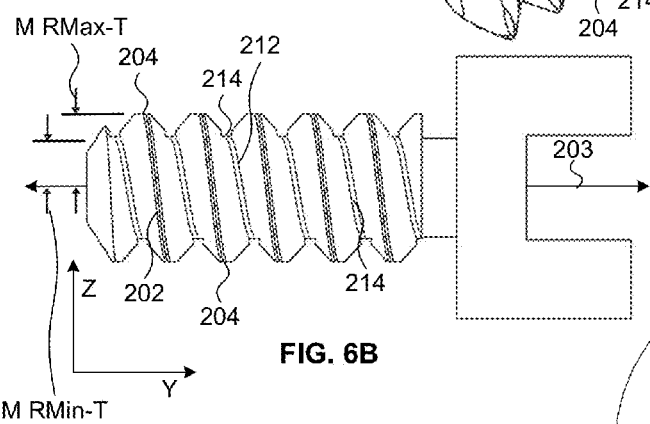
Figure 6C:
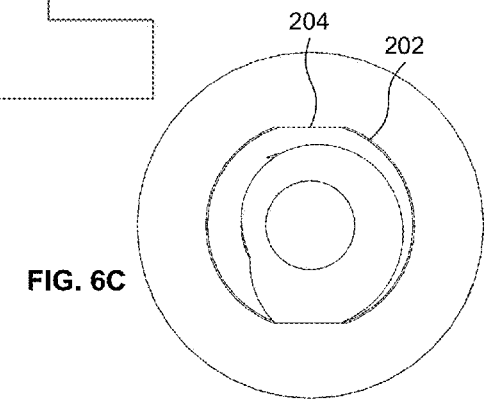
Figure 6D:
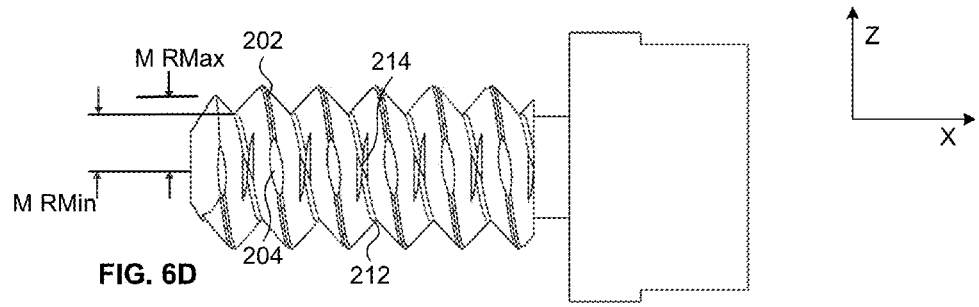
Figure 6E:
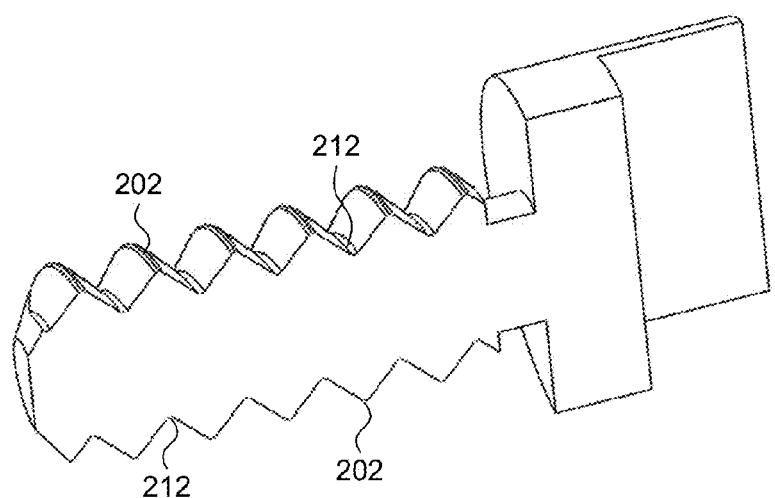
Figure 6F:
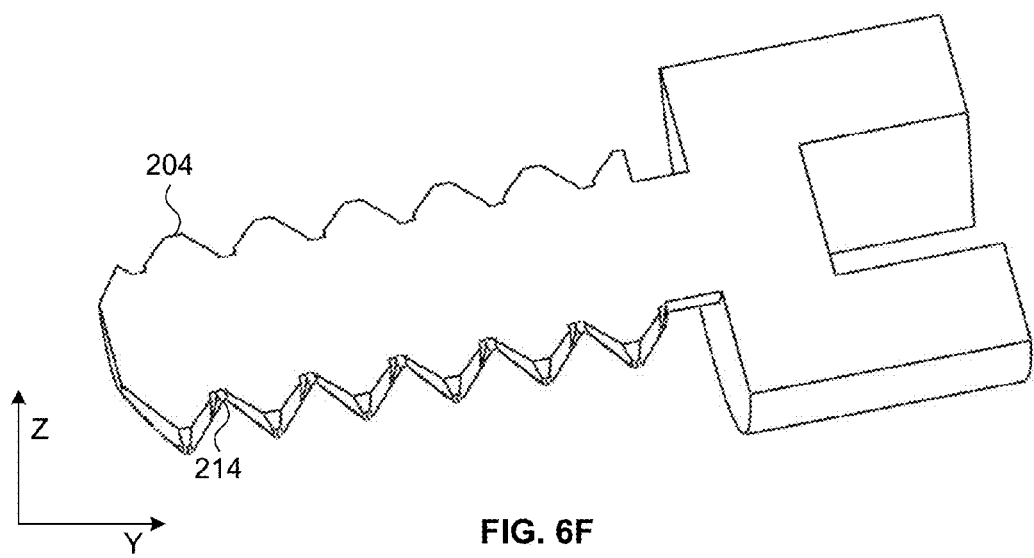

FIGS. 6A-6F provide plan views (FIGS. 6B-6D), perspective views (FIG. 6A), and perspective section views (FIGS. 6E-6F) of a solid model of a male threaded structure or element 200 having an axial orientation 203 along the Y-axis and design modifications 204 and 214 on portions of the maximum radial features 202 and minimum radial features 212, respectively, to allow formation without violating minimum feature size rules. These modifications, down trimmings, or flattening of the maximum and minimum radial features have been provided at the tops and bottoms of these features relative to an assumed layerization or layer stacking that may occur along the Z-axis as illustrated in FIGS. 6B and 6C. FIG. 6D labels the actual radial dimensions of the minimum and maximum features with an $MR_{min}$ and an $MR_{max}$ respectively while FIG. 6B shows the radial dimensions of the trimmed minimum and maximum features with $MR_{min-T}$ and $MR_{max-T}$ respectively. The differences between trimmed extents and untrimmed extents is defined as the difference between $MR_{min}$ and $MR_{min-T}$ and $MR_{max}$ and $MR_{max-T}$ respectively while the axial width expansions associated with the radial decreases is the difference between axial lengths of the untrimmed and trimmed features (not labeled).

FIGS. 7A-7C provide a perspective view (FIG. 7A), plan section views (FIGS. 7B & 7D), and perspective section views (FIGS. 7C-7D) views of a solid model of a sample female threaded structure or element 250 configured to mate with male threaded element 200 of FIGS. 6A-6F wherein the design modifications, trimmings, or flattenings 264 on the minimum radial features 262 allow formation without violating minimum feature size rules. The threaded structure 250 has a longitudinal or axial orientation shown by line 253 and XYZ orientations as shown by the various axes. Radial dimensions of the minimum and maximum radial extents are labeled IN FIG. 7D as $FR_{min}$ and $FR_{max}$ respectively. Portions of the minimum radial features associated with the female threads are shown as being expanded (i.e. axially widened) by the trimming or flattening of regions 264. In some embodiments, as shown in FIGS. 7A and 7D, the female element may include passages 270 that extend from the inward facing threaded regions to a region external to the element. Such passages may be useful in a release process that separates the structural material of the elements from sacrificial material after layer formation is complete.

Figure 8A:
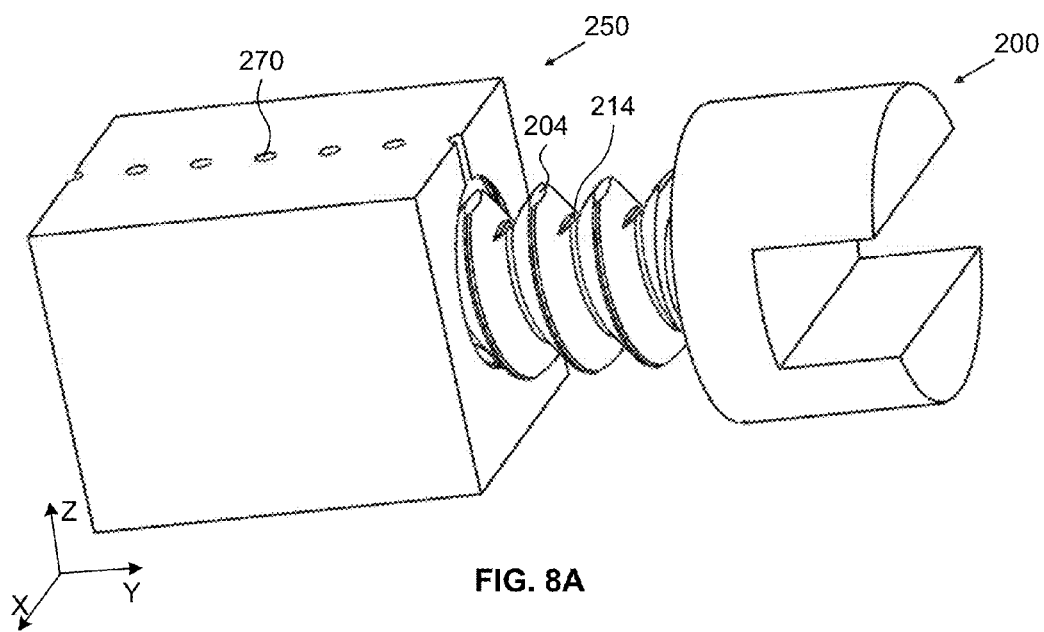
FIGS. 8A-8B provide a mated or partially engaged perspective section view (FIG. 8B) and a mated or partially engaged perspective view (FIG. 8A) view of the male and female threaded structures.
Figure 8B:
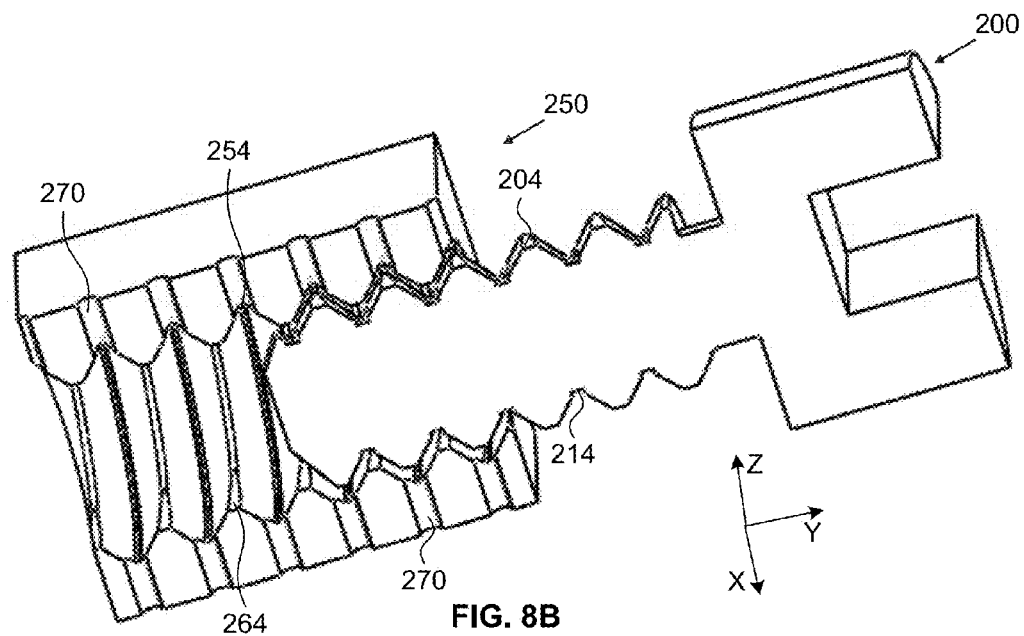

FIGS. 8A-8B provide a mated or partially engaged perspective section view (FIG. 8B) and a mated or partially engaged perspective view (FIG. 8A) view of the male and female threaded structures or elements of FIGS. 6A-7E.

Figure 9A:
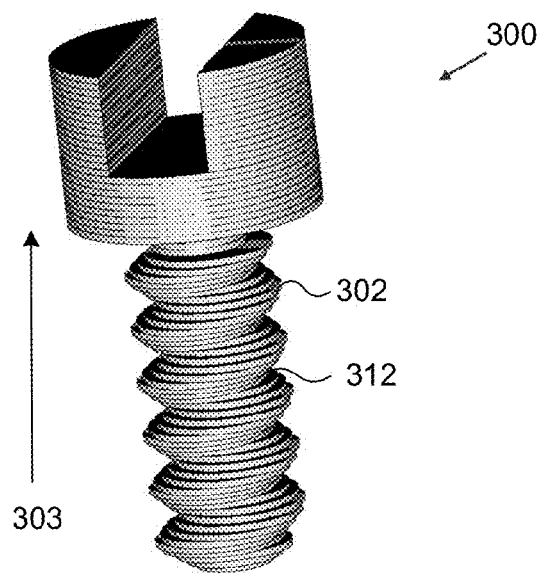
FIGS. 9A-9B provide a perspective view (FIG. 9A) and a perspective section view (FIG. 9B) of a layerized male threaded structure with the stacking axis of the layers being parallel to the longitudinal axis of the threaded device wherein the threaded device includes spiraling regions of maximum radial extension and minimum radial extension at each position along the axial length of the threaded element.
Figure 9B:
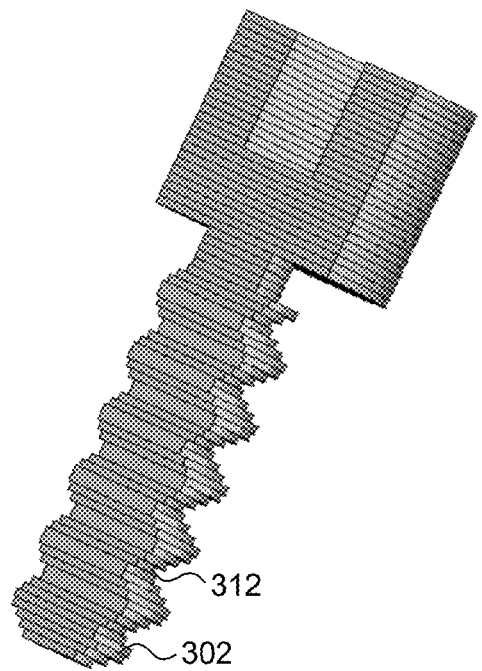

FIGS. 9A & 9B provide a perspective view (FIG. 9A) and a perspective section view (FIG. 9B) of a layerized male threaded structure or element 300 with the stacking axis of the layers being parallel to the longitudinal axis 303 of the threaded device wherein the threaded device includes spiraling regions of maximum radial extension 302 and minimum radial extension 312 at each position along the axial length of the threaded element.

Figure 10A:
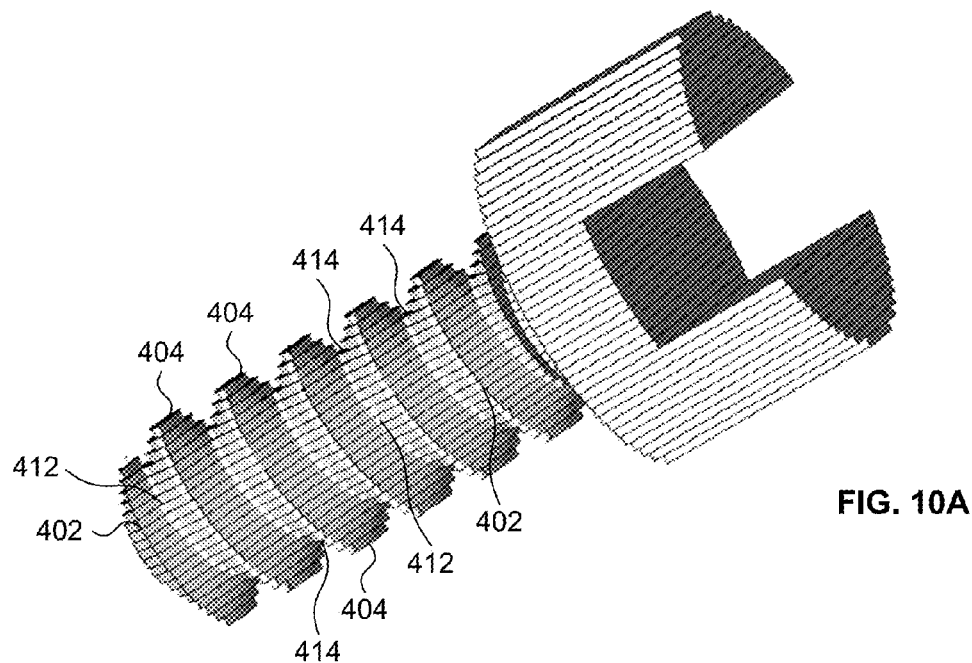
FIGS. 10A-10B provide a perspective view (FIG. 10A) and perspective section view (FIG. 10B) of a layerized male threaded structure with the stacking axis of the layers being perpendicular to the longitudinal axis of the threaded device.
Figure 10B:
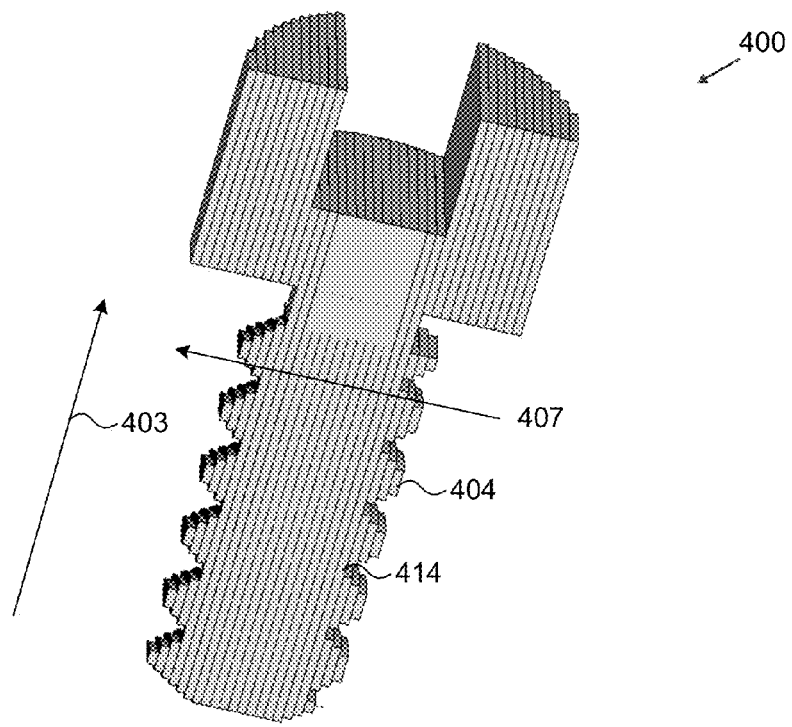

FIGS. 10A & 10B provide a perspective view (FIG. 10A) and perspective section view (FIG. 10B) of a layerized male threaded structure or element 400 with the stacking axis 407 of the layers being perpendicular to the longitudinal axis 403 of the threaded structure wherein the illustrated structure shows trimmed regions 414 and 404 relative to regions 402 and 412 of minimum and maximum radial extents. The trimmed regions 414 and 404 may exist on the lowest and highest layers of the minimum and maximum radial extents and may include minimum and maximum radial extents as these are the locations that are most like to suffer from minimum feature size violations. In some embodiments however, other layer stacking orientations relative to the trimmed regions are possible.

Figure 11A:
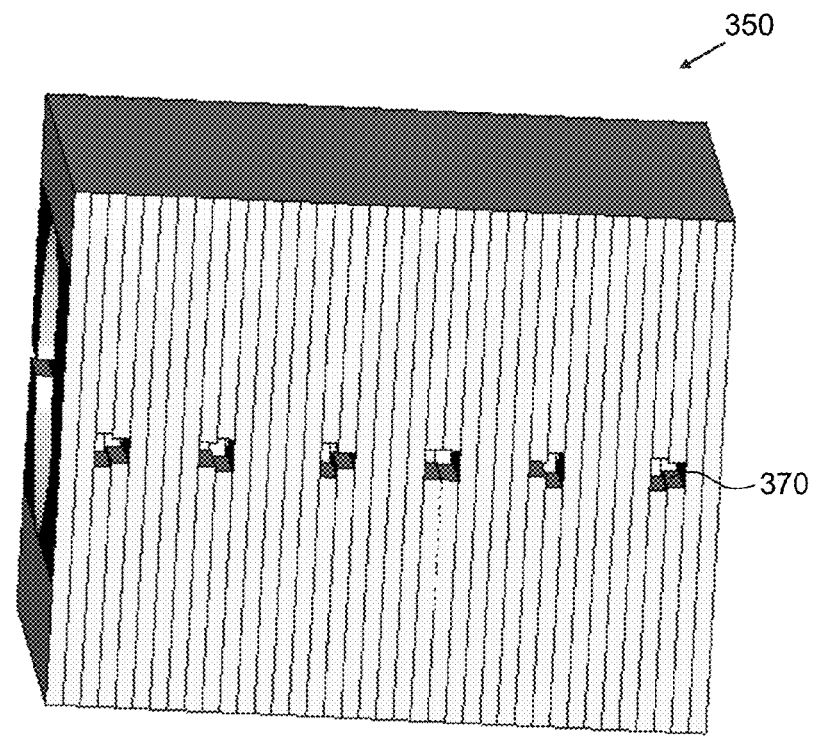
FIGS. 11A-11B provide a perspective view (FIG. 11A) and perspective section view (FIG. 11B) of a layerized female threaded structure with the stacking direction of the layers corresponding to the longitudinal axis of the threaded device.
Figure 11B:
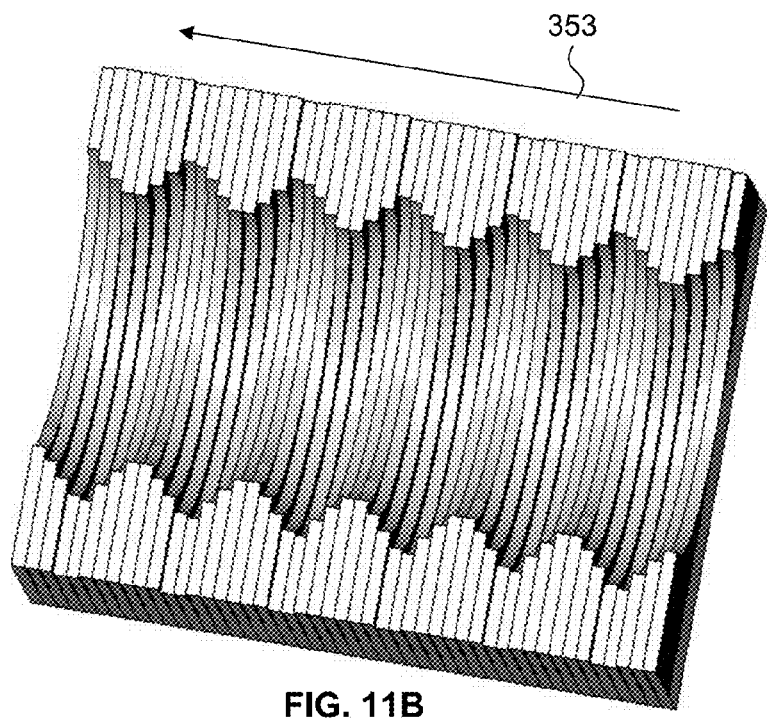

FIGS. 11A & 11B provide a perspective view (FIG. 11A) and perspective section view of a layerized female threaded structure or element 350 with the stacking direction of the layers corresponding to the longitudinal axis 353 of the threaded device wherein release holes 370 can be seen in the side of FIG. 11A.

Figure 12A:
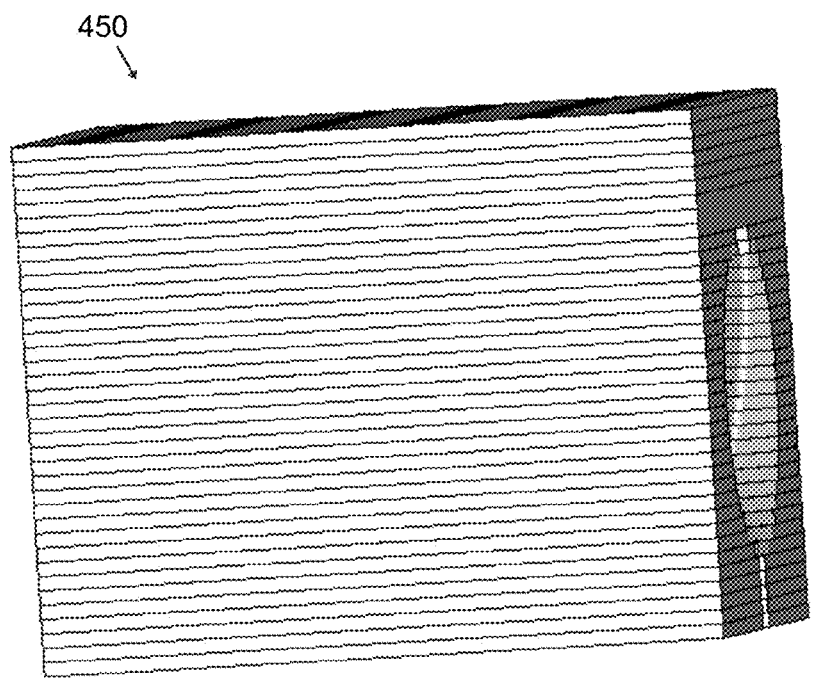
FIGS. 12A-12B provide a perspective view (FIG. 12A) and a perspective section view (FIG. 12B) of a layerized female threaded structure with the stacking direction of the layers perpendicular to the longitudinal axis of the threaded device.
Figure 12B:
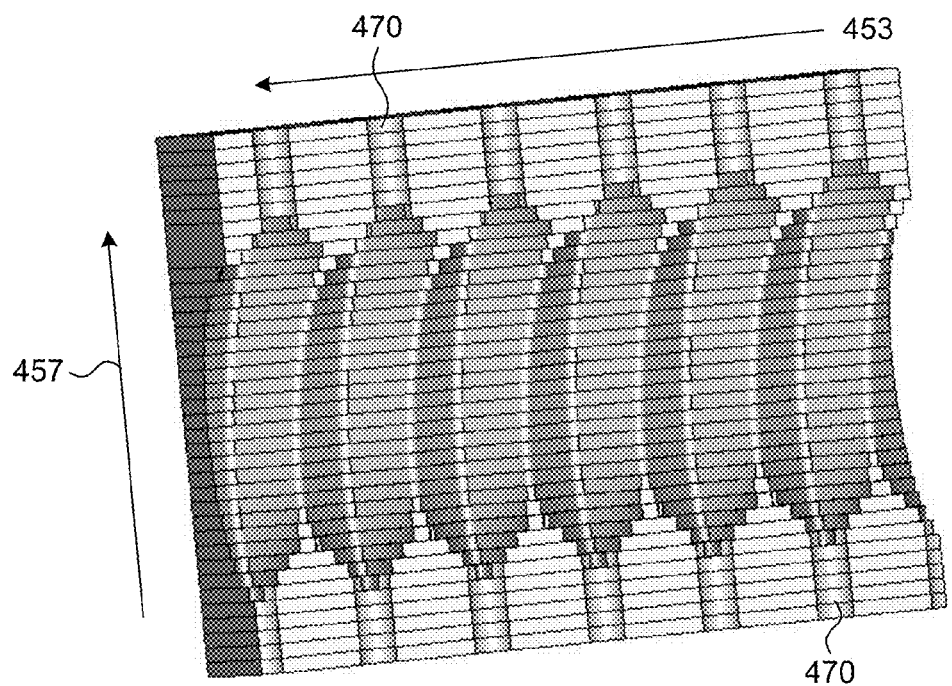

FIGS. 12A & 12B provide a perspective view (FIG. 12A) and a perspective section view (FIG. 12B) of a layerized female threaded structure or element with the stacking direction 457 of the layers being perpendicular to the longitudinal axis 453 of the threaded device wherein etching holes 470 can be seen extending from the threaded region of the section view of FIG. 12B to the upper and lower surfaces of the structure.

Figure 13A:
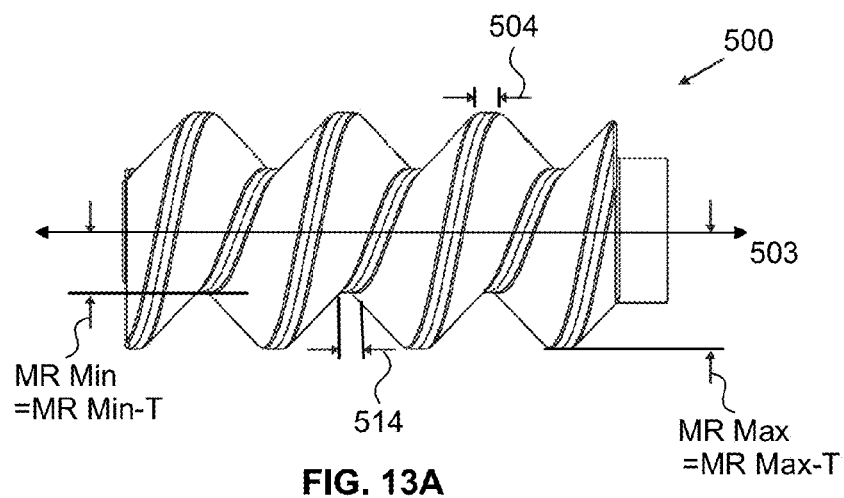
FIGS. 13A-13C a provide plan view (FIG. 13A), a perspective view (FIG. 13B), and section view (FIG. 13C) of a solid model of a male threaded structure or element having design modifications that allow formation without violating minimum feature size rules, wherein the design modifications include expanded axial lengths of the threaded element.
Figure 13B:
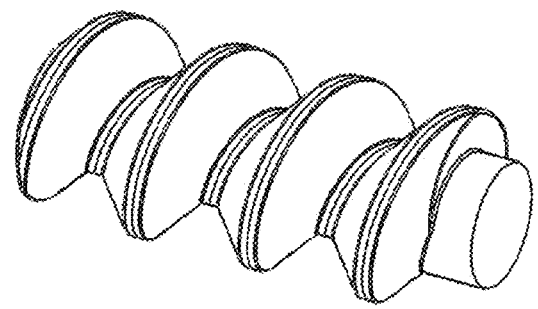
Figure 13C:

FIGS. 13A-13C a provide plan view (FIG. 13A), a perspective view (FIG. 13B), and section view (FIG. 13C) of a solid model of a male threaded structure or element having design modifications that allow formation without violating minimum feature size rules, wherein the design modifications include expanded axial lengths (i.e. flattened or trimmed radial extents) of both the maximum and minimum radially extending portions (as indicated by lengths 504 and 514 respectively) of the threaded element. Unlike the limited or selective flattening or trimming of FIGS. 6A-6F, the flattening or trimming of FIGS. 13A-13C extend around the entire radial sprial and axial length of the maximum and minimum radial extensions. FIG. 13A also shows axis of the threaded element with line 503 and shows that the minimum axial extents and trimmed minimum axial extents are equal as are the maximum axial extents and the trimmed maximum axial extents. In some preferred embodiments, the axial widths resulting from the trimming are at least as great as the layer thickness or are at least as large as the minimum feature size. In other embodiments, other axial widths are possible and may be different for the minimum and maximum radial elements.

Figure 14A:
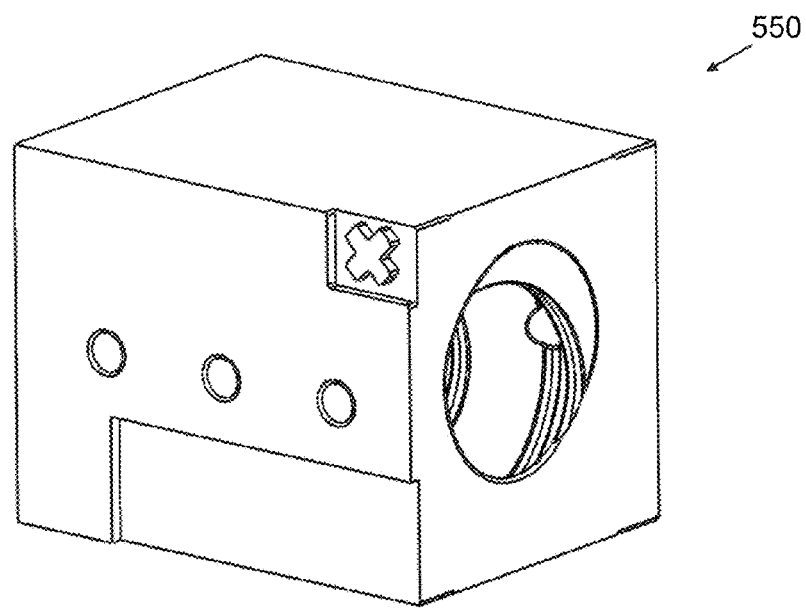
FIGS. 14A-14B provide a perspective (FIG. 14A) and perspective section view (FIG. 14B) of a solid model of a female threaded structure having the design modifications corresponding to those of male threaded structure of FIGS. 13A and 13B.
Figure 14B:
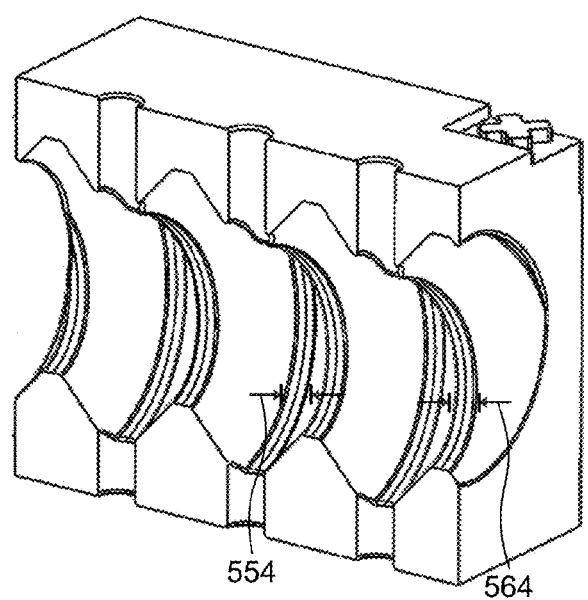

FIGS. 14A-14B provide a perspective (FIG. 14A) and perspective section view (FIG. 14B) of a solid model of a female threaded structure 550 or element having the design modifications corresponding to those of male threaded structure of FIGS. 13A and 13B (as indicated by lengths 504 and 514 respectively). In some embodiments, the width of the maximum radial female thread extensions may be equal to or somewhat smaller than that of their male counterparts while the width of the minimum female radial extensions may be equal to or somewhat greater than that of their male counterparts. In some embodiments, the spacing between male and female thread regions may be relative uniform while in other embodiments the gaps may vary between minimum extents, sloping regions, and maximum extents.

Figure 15A:
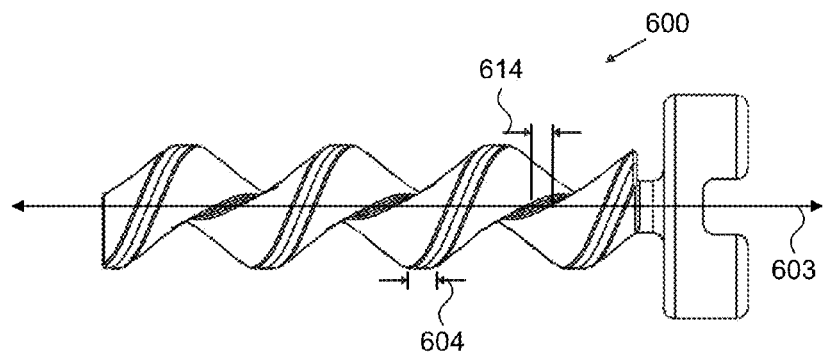
FIG. 15A-15C provide a plan view (FIG. 15A), a perspective view (FIG. 15B), and a perspective section view (FIG. 15C) of a solid model of a male threaded structure that comes closer to a cork-screw or helical configuration of the device as whole as opposed to only the threads edges themselves tracing a helical path.
Figure 15B:
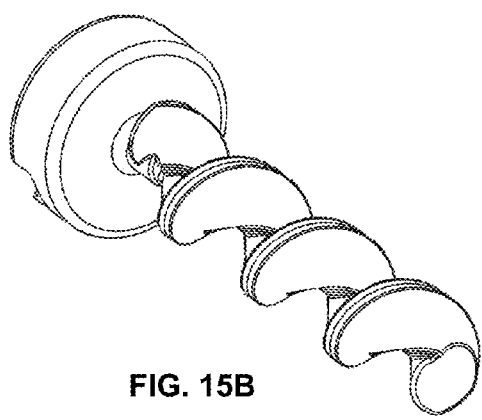
Figure 15C:
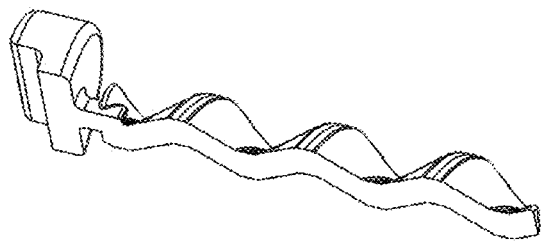

FIG. 15A-15C provide a plan view (FIG. 15A), a perspective view (FIG. 15B), and a perspective section view (FIG. 15C) of a solid model of a male threaded structure 600 that comes closer to a cork-screw or helical configuration of the device as whole as opposed to only the threads edges themselves tracing a helical path. The device of FIGS. 15A-15C has similar design modifications as compared to those set forth in FIGS. 13A-13C (as indicated by lengths 604 and 614 respectively). As noted above, such design modifications may result in structure or device formation while avoiding violation of minimum feature size rules.

Depending on the maximum radial extents of the threaded element and a cross-sectional width of the solid helical element the minimal radial extents may define either an outward facing surface relative to the device axis (positive radius as in FIGS. 5A-5C, 6A-6F, 9A-9C, and 10A-10B) yielding a non-helical or non-cork screw configuration or an inward facing surface relative to the device axis thereby yielding a true helical, cork screw, or coreless configuration of the threaded structure as a whole.

Figure 15D:
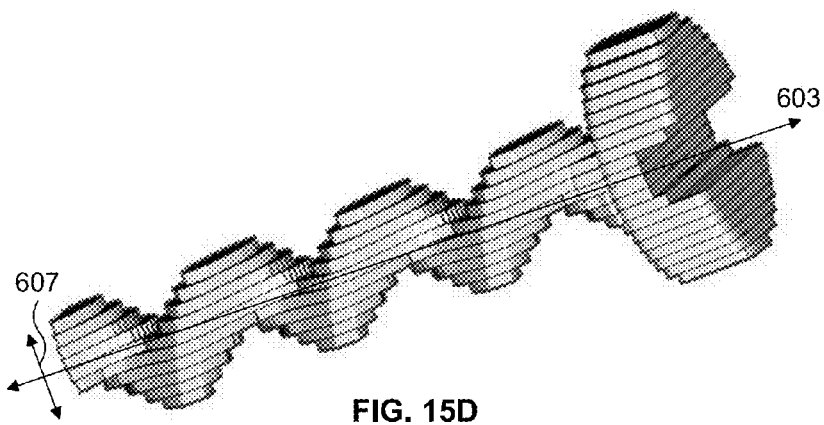
FIG. 15D provides a layerized version of the threaded device of FIGS. 15A-15C with a stacking axis perpendicular to the longitudinal axis of the thread element.

FIG. 15D provides a layerized version of the threaded device 600 of FIGS. 15A-15C with a stacking axis 607 perpendicular to the longitudinal axis 603 of the thread element.

Figure 16A:
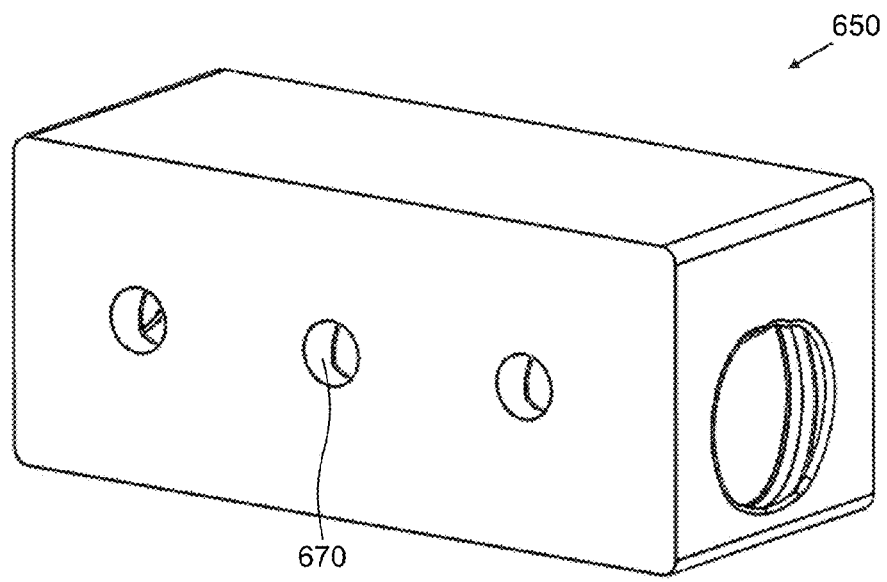
FIG. 16A-16B provide a perspective view (FIG. 16A) and a perspective section view (FIG. 16B) of a solid model of a female male threaded structure or element corresponding to the male element of FIGS. 15A-15C.
Figure 16B:
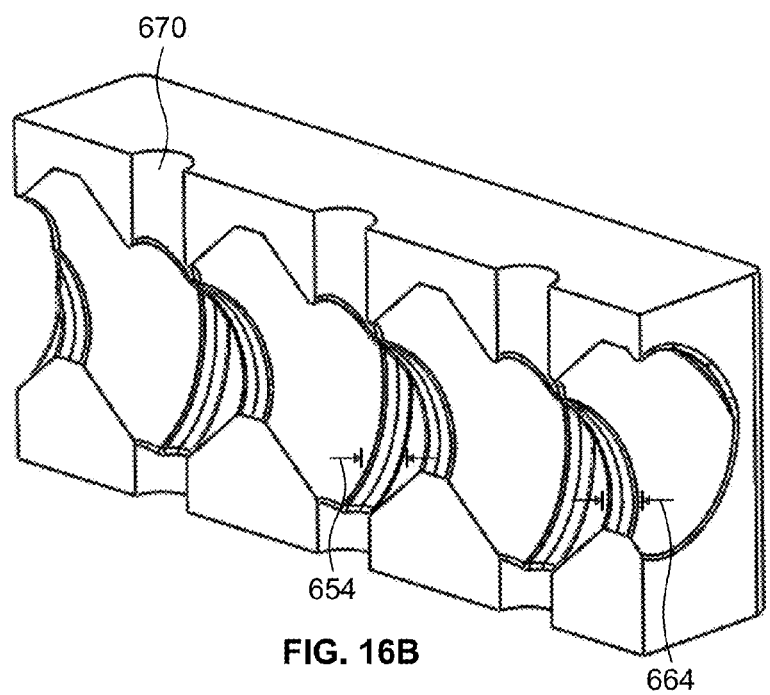

FIGS. 16A and 16B provide a perspective view (FIG. 16A) and a perspective section view (FIG. 16B) of a solid model 650 of a female male threaded structure or element corresponding to the male element of FIGS. 15A-15C. This structure includes flattened or trimmed edges along the entire lengths of both the minimum and maximum radial features as indicated by lengths 654 and 664 respectively which, as noted above, may be useful in allowing layered formation of the structure without violating minimum feature size rules. Passages 670 are also shown as existing in the structure and may be used as release passages or possibly as removal passages for interfering material that is removed prior to putting the structure into actual use or that is removed as a result of actual use.

FIG. 17 illustrates a sample device 700 having holes 721-724 that can be tapped wherein the odd-numbered holes 721 and 723 (seen in cross section) are provided with channels 725, while the even-numbered holes are not. These channels may facilitate release of chips and other fragments produced by the tapping process.

FIG. 18 provides a cut view of example male and female threaded elements 800 and 850, having common axes 803 and 853 where both elements have similar axial lengths for their minimum and maximum radial dimensions wherein the elements have certain radial thread overlap 820 that is dictated by, for example, the thread pitch and the required axial length of the minimum and maximum features. As shown, maximum radial extents 814R and 864R have matching axial extents 814L and 864L, minimum radial extents 804R and 854R have matching axial extents 804L and 854L.

FIG. 19 provides a cut view of an alternative thread configuration of a male threaded element 900 and a female threaded element 950 that have common axes 903 and 953, and a thread overlap of 920 where the minimum and maximum radial features for the male thread have similar axial lengths, 904L to 914L while the minimum and maximum radial features for the female thread also have similar axial lengths, 954L to 964L, but where the axial lengths of the female features are only about one-half of that of the male features.

FIG. 20 provides a cut view of an alternative thread configuration of a male threaded element 1000 and a female threaded element 1050, that have common axes 1003 and 1053, and a thread overlap of 1020 where the minimum and maximum radial features for the male thread have different axial lengths, 1004L to 1014L while the minimum and maximum radial features for the female thread also have different axial lengths, 1054L to 1064L, but where the axial lengths 1054L of the minimum radial female features 1054R are less than that 1004L of the minimum radial male features 1004R and the maximum radial length 1064L of the maximum female radial features 1064R are greater than that 1014L of the maximum radial male features 1014R. In still other embodiments, different combinations of maximum radial extends, maximum axial lengths, minimum radial extents, and minimum radial lengths are possible.

Numerous variations of the above noted embodiments are possible including, for example: (1) different thread pitches (axial length per 360° revolution), (2) instead of continuous threads, the threads may be discontinuous in nature on one or both the male and female elements, (3) different ratios of maximum and minimum radial extents, (4) different types of sloped sidewalls connecting maximum and minimum radial extents to one another, (5) different angles on sloped side walls, (6) different levels of extension of male and female thread elements, (7) use of thread elements with multiple parallel threads as opposed to the single threads illustrated, (8) different axial lengths of threads on male and female elements, (9) female threaded receptacles having male centers into and around which male cork screws elements can thread, (9) threaded elements that include compliant elements for enhanced retention or enhanced centering of male and female elements, (10) threaded elements that have varying pitch at some axial position to cause interference for enhanced retention, (11) threaded elements without expanded heads.

As noted above in some embodiment, potential interference and minimum feature size issues may be resolved by the selective removal of potential conflicting regions or by the global modification of the design features. In some embodiments, modifications may be limited to a male element or a female element while in other embodiments the modifications may be made to both.

In some alternative embodiments, the threaded elements may be formed by multi-layer multi-materials fabrication methods but instead of building up the structure from a plurality of planar layers the structure may be formed from a plurality of cylindrical or other layer configurations. Such formation methods are described in U.S. Pat. No. 6,027,630, referenced above, and in U.S. Patent Application No. 61/141,797, filed Dec. 31, 2008, by Cohen and entitled "Cylindrical Multi-Layer, Multi-Material Electrochemical Fabrication Methods" and U.S. patent application Ser. No. 12/651,088, filed Dec. 31, 2009 by Cohen and entitled "Cylindrical Multi-Layer, Multi-Material Electrochemical Fabrication Methods". These patents and applications are incorporated herein by reference as if set forth in full herein.

In some embodiments, the threaded devices may have tapering diameter in which the maximum and/or minimum radial extents may have different magnitudes at different axial positions along the length of the threaded element. The thread elements may include heads with tool engagement surfaces or tool engagement surfaces may be formed directly into one or both ends of a threaded structure. The threads of threaded structures may be axially continuous or discontinuous. The threaded structures may have only a fractional portion of a complete 360° turn or may include multiple complete turns (e.g. two to ten turns). Portions of the thread element may include clips, springs, varied pitch, varied diameter, or other retention enhancing features. Planar layer stacking in fabrication methods and in formed devices may have an axis that is parallel, perpendicular, or at some other angle relative to the axis of the threaded element. In some embodiments, thread formation may be complete from the layer fabrication process while in other embodiments, threading or threading enhancement may occur in supplemental processing steps such as taping or die cutting.

Further Comments and Conclusions

Structural or sacrificial dielectric materials may be incorporated into embodiments of the present invention in a variety of different ways. Such materials may form a third material or higher deposited on selected layers or may form one of the first two materials deposited on some layers. Additional teachings concerning the formation of structures on dielectric substrates and/or the formation of structures that incorporate dielectric materials into the formation process and possibility into the final structures as formed are set forth in a number of patent applications filed Dec. 31, 2003. The first of these filings is U.S. Patent Application No. 60/534,184 which is entitled "Electrochemical Fabrication Methods Incorporating Dielectric Materials and/or Using Dielectric Substrates". The second of these filings is U.S. Patent Application No. 60/533,932, which is entitled "Electrochemical Fabrication Methods Using Dielectric Substrates". The third of these filings is U.S. Patent Application No. 60/534,157, which is entitled "Electrochemical Fabrication Methods Incorporating Dielectric Materials". The fourth of these filings is U.S. Patent Application No. 60/533,891, which is entitled "Methods for Electrochemically Fabricating Structures Incorporating Dielectric Sheets and/or Seed layers That Are Partially Removed Via Planarization". A fifth such filing is U.S. Patent Application No. 60/533,895, which is entitled "Electrochemical Fabrication Method for Producing Multi-layer Three-Dimensional Structures on a Porous Dielectric". Additional patent filings that provide teachings concerning incorporation of dielectrics into the EFAB process include U.S. patent application Ser. No. 11/139,262, filed May 26, 2005 by Lockard, et al., and which is entitled "Methods for Electrochemically Fabricating Structures Using Adhered Masks, Incorporating Dielectric Sheets, and/or Seed Layers that are Partially Removed Via Planarization"; and U.S. patent application Ser. No. 11/029,216, filed Jan. 3, 2005 by Cohen, et al., now abandoned, and which is entitled "Electrochemical Fabrication Methods Incorporating Dielectric Materials and/or Using Dielectric Substrates". These patent filings are each hereby incorporated herein by reference as if set forth in full herein.

Some embodiments may employ diffusion bonding or the like to enhance adhesion between successive layers of material. Various teachings concerning the use of diffusion bonding in electrochemical fabrication processes are set forth in U.S. patent application Ser. No. 10/841,384 which was filed May 7, 2004 by Cohen et al., now abandoned, which is entitled "Method of Electrochemically Fabricating Multilayer Structures Having Improved Interlayer Adhesion" and which is hereby incorporated herein by reference as if set forth in full. This application is hereby incorporated herein by reference as if set forth in full.

Some embodiments may incorporate elements taught in conjunction with other medical devices as set forth in various U.S. patent applications filed by the owner of the present application and/or may benefit from combined use with these other medical devices: Some of these alternative devices have been described in the following previously filed patent applications: (1) U.S. patent application Ser. No. 11/478,934, by Cohen et al., and entitled "Electrochemical Fabrication Processes Incorporating Non-Platable Materials and/or Metals that are Difficult to Plate On"; (2) U.S. patent application Ser. No. 11/582,049, by Cohen, and entitled "Discrete or Continuous Tissue Capture Device and Method for Making"; (3) U.S. patent application Ser. No. 11/625,807, by Cohen, and entitled "Microdevices for Tissue Approximation and Retention, Methods for Using, and Methods for Making"; (4) U.S. patent application Ser. No. 11/696,722, by Cohen, and entitled "Biopsy Devices, Methods for Using, and Methods for Making"; (5) U.S. patent application Ser. No. 11/734,273, by Cohen, and entitled "Thrombectomy Devices and Methods for Making"; (6) U.S. Patent Application No. 60/942,200, by Cohen, and entitled "Micro-Umbrella Devices for Use in Medical Applications and Methods for Making Such Devices"; and (7) U.S. patent application Ser. No. 11/444,999, by Cohen, and entitled "Microtools and Methods for Fabricating Such Tools". Each of these applications is incorporated herein by reference as if set forth in full herein.

Though the embodiments explicitly set forth herein have considered multi-material layers to be formed one after another. In some embodiments, it is possible to form structures on a layer-by-layer basis but to deviate from a strict planar layer on planar layer build up process in favor of a process that interlaces material between the layers. Such alternative build processes are disclosed in U.S. application Ser. No. 10/434,519, filed on May 7, 2003, now U.S. Pat. No. 7,252,861, entitled Methods of and Apparatus for Electrochemically Fabricating Structures Via Interlaced Layers or Via Selective Etching and Filling of Voids. The techniques disclosed in this referenced application may be combined with the techniques and alternatives set forth explicitly herein to derive additional alternative embodiments. In particular, the structural features are still defined on a planar-layer-by-planar-layer basis but material associated with some layers is formed along with material for other layers such that interlacing of deposited material occurs. Such interlacing may lead to reduced structural distortion during formation or improved interlayer adhesion. This patent application is herein incorporated by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| US Pat App No., Filing Date US App Pub No., Pub Date US Patent No., Pub Date | Inventor, Title |
|---|---|
| 09/493,496 - Jan. 28, 2000 PAT 6,790,377 - Sep. 14, 2004 | Cohen, "Method For Electrochemical Fabrication" |
| 10/677,556 - Oct. 1, 2003 2004 - 0134772 - Jul. 15, 2004 | Cohen, "Monolithic Structures Including Alignment and/or Retention Fixtures for Accepting Components" |
| 10/830,262 - Apr. 21, 2004 2004 - 0251142A - Dec. 16, 2004 PAT 7,198,704 - Apr. 3, 2007 | Cohen, "Methods of Reducing Interlayer Discontinuities in Electrochemically Fabricated Three-Dimensional Structures" |
| 10/271,574 - Oct. 15, 2002 2003 - 0127336A - Jul. 10, 2003 PAT 7,288,178 - Oct. 30, 2007 | Cohen, "Methods of and Apparatus for Making High Aspect Ratio Microelectromechanical Structures" |
| 10/697,597 - Dec. 20, 2002 2004 - 0146650A - Jul. 29, 2004 | Lockard, "EFAB Methods and Apparatus Including Spray Metal or Powder Coating Processes" |
| 10/677,498 - Oct. 1, 2003 2004 - 0134788 - Jul. 15, 2004 PAT 7,235,166 - Jun. 26, 2007 | Cohen, "Multi-cell Masks and Methods and Apparatus for Using Such Masks To Form Three-Dimensional Structures" |
| 10/724,513 - Nov. 26, 2003 2004 - 0147124 - Jul. 29, 2004 PAT 7,368,044 - May 6, 2008 | Cohen, "Non-Conformable Masks and Methods and Apparatus for Forming Three-Dimensional Structures" |
| 10/607,931 - Jun. 27, 2003 2004 - 0140862 - Jul. 22, 2004 PAT 7,239,219 - Jul. 3, 2007 | Brown, "Miniature RF and Microwave Components and Methods for Fabricating Such Components" |
| 10/841,100 - May 7, 2004 2005 - 0032362 - Feb. 10, 2005 PAT 7,109,118 - Sep. 19, 2006 | Cohen, "Electrochemical Fabrication Methods Including Use of Surface Treatments to Reduce Overplating and/or Planarization During Formation of Multi-layer Three-Dimensional Structures" |
| 10/387,958 - Mar. 13, 2003 2003 - 022168A - Dec. 4, 2003 | Cohen, "Electrochemical Fabrication Method and Application for Producing Three-Dimensional Structures Having Improved Surface Finish" |
| 10/434,494 - May 7, 2003 2004 - 0000489A - Jan. 1, 2004 | Zhang, "Methods and Apparatus for Monitoring Deposition Quality During Conformable Contact Mask Plating Operations" |
| 10/434,289 - May 7, 2003 2004 - 0065555A - Apr. 8, 2004 | Zhang, "Conformable Contact Masking Methods and Apparatus Utilizing In Situ Cathodic Activation of a Substrate" |

-continued

| US Pat App No., Filing Date US App Pub No., Pub Date US Patent No., Pub Date | Inventor, Title |
|---|---|
| 10/434,294 - May 7, 2003 2004 - 0065550A - Apr. 8, 2004 | Zhang, "Electrochemical Fabrication Methods With Enhanced Post Deposition Processing" |
| 10/434,295 - May 7, 2003 2004 - 0004001A - Jan. 8, 2004 | Cohen, "Method of and Apparatus for Forming Three-Dimensional Structures Integral With Semiconductor Based Circuitry" |
| 10/434,315 - May 7, 2003 2003 - 0234179 A - Dec. 25, 2003 PAT 7,229,542 - Jun. 12, 2007 | Bang, "Methods of and Apparatus for Molding Structures Using Sacrificial Metal Patterns" |
| 10/434,103 - May 7, 2004 2004 - 0020782A - Feb. 5, 2004 PAT 7,160,429 - Jan. 9, 2007 | Cohen, "Electrochemically Fabricated Hermetically Sealed Microstructures and Methods of and Apparatus for Producing Such Structures" |
| 10/841,006 - May 7, 2004 2005 - 0067292 - May 31, 2005 | Thompson, "Electrochemically Fabricated Structures Having Dielectric or Active Bases and Methods of and Apparatus for Producing Such Structures" |
| 10/434,519 - May 7, 2003 2004 - 0007470A - Jan. 15, 2004 PAT 7,252,861 - Aug. 7, 2007 | Smalley, "Methods of and Apparatus for Electrochemically Fabricating Structures Via Interlaced Layers or Via Selective Etching and Filling of Voids" |
| 10/724,515 - Nov. 26, 2003 2004 - 0182716 - Sep. 23, 2004 APT 7,291,254 - Nov. 6, 2007 | Cohen, "Method for Electrochemically Forming Structures Including Non-Parallel Mating of Contact Masks and Substrates" |
| 10/841,347 - May 7, 2004 2005 - 0072681 - Apr. 7, 2005 | Cohen, "Multi-step Release Method for Electrochemically Fabricated Structures" |
| 60/533,947 - Dec. 31, 2003 | Kumar, "Probe Arrays and Method for Making" |
| 60/534,183 - Dec. 31, 2003 | Cohen, "Method and Apparatus for Maintaining Parallelism of Layers and/or Achieving Desired Thicknesses of Layers During the Electrochemical Fabrication of Structures" |
| 11/733,195 - Apr. 9, 2007 2008 - 0050524 - Feb. 28, 2008 | Kumar, "Methods of Forming Three-Dimensional Structures Having Reduced Stress and/or Curvature" |
| 11/506,586 - Aug. 8, 2006 20007 - 0039828 - Feb. 22, 2007 | Cohen, "Mesoscale and Microscale Device Fabrication Methods Using Split Structures and Alignment Elements" |
| 10/949,744 - Sep. 24, 2004 2005 - 0126916 - Jun. 16, 2005 | Lockard, "Three-Dimensional Structures Having Feature Sizes Smaller Than a Minimum Feature Size and Methods for Fabricating" |

Though various portions of this specification have been provided with headers, it is not intended that the headers be used to limit the application of teachings found in one portion of the specification from applying to other portions of the specification. For example, it should be understood that alternatives acknowledged in association with one embodiment, are intended to apply to all embodiments to the extent that the features of the different embodiments make such application functional and do not otherwise contradict or remove all benefits of the adopted embodiment. Various other embodiments of the present invention exist. Some of these embodiments may be based on a combination of the teachings herein with various teachings incorporated herein by reference.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

We claim:

1. A micro-scale or millimeter scale device, comprising:
 (a) a male threaded element, comprising:
  i. an axial dimension and a radial dimension that extends perpendicular to the axial dimension;
  ii. at least one outward facing thread comprising radial extensions and radial depressions that define a substantially spiral turn around and along the axial dimension and wherein the radial extensions provide an outer male thread radius and wherein the radial depressions provide an inner male thread radius;
 wherein the male threaded element has a stair stepped configuration with the stair steps defining a plurality of planes spaced from adjacent planes by a layer thickness, and
 (b) a female threaded element, comprising:
  i. an axial dimension and a radial dimension that extends perpendicular to the axial dimension;
  ii. at least one inward facing female thread comprising radial extensions defining openings of smaller radius and radial depressions defining openings of larger radius, wherein the thread provides a substantially spiral turn around and along the axial dimension and wherein the radial extensions provide an inner female thread radius;
 wherein the female threaded element has a stair stepped configuration with the stair steps defining a plurality of planes spaced from adjacent planes by a layer thickness,
 wherein the male threaded element and the female threaded element are configured to thread together.

2. The device of claim 1 wherein the spiral turn of the male threaded element is continuous.

3. The device of claim 2 wherein the spiral turn of the female threaded element is continuous.

4. The device of claim 2 wherein the spiral turn of the female threaded element is discontinuous.

5. The device of claim 1 wherein the spiral turn of the male threaded element is discontinuous.

6. The device of claim 5 wherein the spiral turn of the female threaded element is discontinuous.

7. The device of claim 1 wherein the spiral turn of both the male and female threaded elements extends at least 180°.

8. The device of claim 1 wherein the spiral turn of both the male and female threaded elements extends at least 360°.

9. The device of claim 1 wherein the spiral turn of both the male and female threaded elements extends at least 720°.

10. The device of claim 1 wherein the female threaded element includes a plurality of release holes.

11. The device of claim 1 wherein the male threaded element comprises a multiple threaded element.

12. The device of claim 5 wherein the spiral turn of the female threaded element is continuous.

* * * * *